US012507779B2

(12) United States Patent
Carlyle et al.

(10) Patent No.: US 12,507,779 B2
(45) Date of Patent: Dec. 30, 2025

(54) HAIR STYLING APPLIANCE

(71) Applicant: Dyson Technology Limited, Wiltshire (GB)

(72) Inventors: Thomas Alexander Carlyle, Swindon (GB); Darren Matthew Lewis, Bristol (GB); Henry Licming Lambourn, Malmesbury (GB); Joseph Timm, Bristol (GB)

(73) Assignee: Dyson Technology Limited, Malmesbury (GB)

( * ) Notice: Subject to any disclaimer, the term of this patent is extended or adjusted under 35 U.S.C. 154(b) by 221 days.

(21) Appl. No.: 18/563,855

(22) PCT Filed: May 10, 2022

(86) PCT No.: PCT/GB2022/051189
§ 371 (c)(1),
(2) Date: Nov. 22, 2023

(87) PCT Pub. No.: WO2022/248832
PCT Pub. Date: Dec. 1, 2022

(65) Prior Publication Data

US 2024/0215699 A1 Jul. 4, 2024

(30) Foreign Application Priority Data

May 27, 2021 (GB) .................................... 2107571

(51) Int. Cl.
*A45D 2/40* (2006.01)
*A45D 1/04* (2006.01)
(Continued)

(52) U.S. Cl.
CPC ................ *A45D 2/40* (2013.01); *A45D 1/04* (2013.01); *A45D 2/001* (2013.01); *H05B 6/62* (2013.01);
(Continued)

(58) Field of Classification Search
CPC . A45D 2/001; A45D 2/40; A45D 1/04; A45D 2001/045
See application file for complete search history.

(56) References Cited

U.S. PATENT DOCUMENTS 2,526,283 A 10/1950 Schmidt
2,561,609 A 7/1951 Briggs
(Continued)

FOREIGN PATENT DOCUMENTS

CN 108065562 A 5/2018
DE 3148538 A1 6/1983
(Continued)

OTHER PUBLICATIONS

Anonymous, "Power Inverter Circuits for High Frequency Dielectric Heating of Hair", 19 pages.
(Continued)

*Primary Examiner* — Eric J Rosen
*Assistant Examiner* — Sydney J Pulvidente
(74) *Attorney, Agent, or Firm* — Tucker Ellis LLP; Michael G. Craig

(57) ABSTRACT

A hair styling appliance is described having a pair of electrodes, a chamber located between the electrodes for receiving a section of hair, and a drive unit for applying an alternating voltage to the electrodes to heat the hair dielectrically. The electrodes have a fixed spacing.

11 Claims, 10 Drawing Sheets

(51) Int. Cl.

| | |
|---|---|
| ***A45D 2/00*** | (2006.01) |
| ***H05B 6/48*** | (2006.01) |
| ***H05B 6/54*** | (2006.01) |
| ***H05B 6/62*** | (2006.01) |

(52) U.S. Cl.
CPC .......... *A45D 2001/045* (2013.01); *H05B 6/48* (2013.01); *H05B 6/54* (2013.01)

(56) References Cited

U.S. PATENT DOCUMENTS

| | | | | |
|---|---|---|---|---|
| 4,627,451 | A | 12/1986 | Chang | |
| 4,674,025 | A | 6/1987 | Edwards | |
| 5,475,580 | A | 12/1995 | Noro | |
| 5,673,188 | A | 9/1997 | Lusher et al. | |
| 7,586,066 | B2 | 9/2009 | Bell | |
| 9,038,645 | B2 | 5/2015 | Wandke et al. | |
| 9,572,412 | B2 | 2/2017 | Vic et al. | |
| 9,775,419 | B2 | 10/2017 | Genain et al. | |
| 9,854,892 | B2 | 1/2018 | Moore et al. | |
| 11,771,192 | B2 | 10/2023 | Moore et al. | |
| 11,771,193 | B2 | 10/2023 | Vic et al. | |
| 2006/0196523 | A1* | 9/2006 | Choi | A45D 1/06 132/224 |
| 2010/0101599 | A1 | 4/2010 | Choi | |
| 2010/0242985 | A1 | 9/2010 | Kaizuka | |
| 2011/0108051 | A1 | 5/2011 | Yahnker et al. | |
| 2013/0152959 | A1 | 6/2013 | Genain et al. | |
| 2013/0306100 | A1 | 11/2013 | Wandke et al. | |
| 2013/0319452 | A1 | 12/2013 | Joo et al. | |
| 2014/0353301 | A1* | 12/2014 | Rizzuto | A45D 1/04 38/71 |
| 2015/0107616 | A1 | 4/2015 | Bormashenko et al. | |
| 2016/0255936 | A1* | 9/2016 | deGrood | A45D 1/04 |
| 2017/0360174 | A1 | 12/2017 | Moore et al. | |
| 2018/0035776 | A1* | 2/2018 | Weatherly | A45D 1/06 |
| 2019/0007004 | A1 | 1/2019 | Raymond et al. | |
| 2020/0085084 | A1 | 3/2020 | Piel et al. | |
| 2021/0052056 | A1 | 2/2021 | Vic et al. | |
| 2023/0181429 | A1 | 6/2023 | Moore et al. | |

FOREIGN PATENT DOCUMENTS

| | | | |
|---|---|---|---|
| DE | 102009045498 | A1 | 4/2011 |
| EP | 0183507 | B1 | 2/1989 |
| EP | 2861096 | B1 | 8/2016 |
| EP | 2568848 | B1 | 11/2016 |
| EP | 3236797 | A2 | 11/2017 |
| EP | 3505004 | | 7/2019 |
| GB | 0589911 | A | 7/1947 |
| GB | 0611710 | A | 11/1948 |
| GB | 0617246 | A | 2/1949 |
| GB | 0617274 | | 2/1949 |
| GB | 0704364 | A | 2/1954 |
| GB | 2533602 | A | 6/2016 |
| GB | 2535504 | A | 8/2016 |
| GB | 2569647 | A | 6/2019 |
| GB | 2567450 | B | 7/2020 |
| JP | 3590155 | B2 | 11/2004 |
| KR | 10-1036422 | B1 | 5/2011 |
| KR | 10-2015-0060474 | A | 6/2015 |
| KR | 10-2020-0090280 | A | 7/2020 |
| KR | 20-2021-0000744 | U | 4/2021 |
| WO | 2013004519 | A1 | 1/2013 |
| WO | 2014/068795 | A1 | 5/2014 |
| WO | 2016/102972 | A2 | 6/2016 |
| WO | 2019/122850 | A1 | 6/2019 |
| WO | 2021/046649 | A1 | 3/2021 |
| WO | 2021/156162 | A1 | 8/2021 |
| WO | 2022/248831 | A1 | 12/2022 |
| WO | 2022/248833 | A1 | 12/2022 |

OTHER PUBLICATIONS

Examination Report received for GB Application No. 2107567.6, mailed on Nov. 2, 2023, 3 pages.
Examination Report received for GB Application No. 2107570.0, mailed on Sep. 11, 2023, 2 pages.
International Search Report and Written Opinion received for PCT Patent Application No. PCT/GB2022/051190, mailed on Jul. 29, 2022, 12 pages.
International Search Report and Written Opinion received for PCT Patent Application No. PCT/GB2022/051182, mailed on Jul. 25, 2022, 11 pages.
International Search Report and Written Opinion received for PCT Patent Application No. PCT/GB2022/051183, mailed on Jul. 26, 2022, 11 pages.
International Search Report and Written Opinion received for PCT Patent Application No. PCT/GB2022/051184, mailed on Jul. 27, 2022, 10 pages.
International Search Report and Written Opinion received for PCT Patent Application No. PCT/GB2022/051185, mailed on Jul. 25, 2022, 11 pages.
International Search Report and Written Opinion received for PCT Patent Application No. PCT/GB2022/051186, mailed on Jul. 22, 2022, 12 pages.
International Search Report and Written Opinion received for PCT Patent Application No. PCT/GB2022/051187, mailed on Jul. 27, 2022, 12 pages.
International Search Report and Written Opinion received for PCT Patent Application No. PCT/GB2022/051188, mailed on Jul. 27, 2022, 9 pages.
International Search Report and Written Opinion received for PCT Patent Application No. PCT/GB2022/051189, mailed on Jul. 27, 2022, 10 pages.
International Search Report and Written Opinion received for PCT Patent Application No. PCT/GB2022/051191, mailed on Jul. 29, 2022, 11 pages.
Search Report received for GB Application No. 2107564.3, mailed on Nov. 17, 2021, 2 pages.
Search Report received for GB Application No. 2107566.8, mailed on Nov. 17, 2021, 2 pages.
Search Report received for GB Application No. 2107562.7, mailed on Nov. 17, 2021, 2 pages.
Search Report received for GB Application No. 2107563.5, mailed on Nov. 11, 2021, 1 page.
Search Report received for GB Application No. 2107565.0, mailed on Nov. 17, 2021, 2 pages.
Search Report received for GB Application No. 2107567.6, mailed on Oct. 11, 2021, 1 page.
Search Report received for GB Application No. 2107568.4, mailed on Sep. 28, 2021, 2 pages.
Search Report received for GB Application No. 2107569.2, mailed on Oct. 6, 2021, 1 page.
Search Report received for GB Application No. 2107570.0, mailed on Sep. 16, 2021, 1 page.
Search Report received for GB Application No. 2107571.8, mailed on Nov. 17, 2021, 2 pages.

* cited by examiner

HAIR STYLING APPLIANCE

CROSS-REFERENCE TO PRIOR APPLICATIONS

This application is a § 371 National Stage Application of PCT International Application No. PCT/GB2022/051189 filed May 10, 2022, which claims the priority of United Kingdom Application No. 2107571.8, filed May 27, 2021, each of which are herein incorporated by reference in their entirety.

FIELD OF THE INVENTION

The present invention relates to a hair styling appliance.

BACKGROUND OF THE INVENTION

A hair styling appliance may comprise heating plates that are heated to temperatures of around 200° C. Hair is then clamped between the heating plates, and the high temperatures break hydrogen bonds within the hair, allowing the hair to be reshaped and styled.

SUMMARY OF THE INVENTION

The present invention provides a hair styling appliance comprising: a pair of electrodes; a chamber located between the electrodes for receiving a section of hair; and a drive unit for applying an alternating voltage to the electrodes to heat dielectrically hair within the chamber, wherein the electrodes having a fixed spacing.

With the hair styling appliance of the present invention, hair is heated dielectrically. Consequently, in contrast to a conventional styling appliance having heating plates, the hair may be heated without first having to heat a surface of the appliance. The appliance is therefore potentially safer since it is not necessary to heat the appliance to temperatures of around 200° C. Although the temperature of the appliance may increase during use, this arises from the transfer of heat from the hair to the appliance, rather than the other way around. Additionally, in comparison to a conventional styling appliance having heating plates, the appliance of the present invention is potentially more efficient. With a conventional styling appliance, the electrical power drawn by the heating plates can be significant even when there is no hair between the plates. With the appliance of the present invention, on the other hand, relatively little power is likely to be drawn by the electrodes in the absence of hair. This is because the power drawn by the electrodes depends on the impedance of the electrodes, which in turn depends on the dielectric constant of the material between the electrodes. The dielectric constant of air is around 1 and therefore, in the absence of hair, the power drawn by the electrodes is likely to be relatively low. The electrodes of the appliance have a fixed spacing. As a result, at least one of the following advantages may be achieved. First, the strength of the electric field generated between the electrodes depends on the electrode spacing. By having a fixed spacing, a more consistent field strength may be achieved with each use of the appliance. As a result, heating of the hair may be more consistent. By contrast, if the electrodes were moveable, the strength of the electric field may vary. As a result, heating of the hair may be inconsistent. For example, heating may be lower with a larger spacing and higher with a smaller spacing. This inconsistent heating may then lead to poor user satisfaction. Second, by having a fixed spacing, good coupling of the energy of the electric field with the hair may be achieved at a single alternating frequency, thus simplifying the drive unit. By contrast, if the electrodes were movable then, as the spacing varies, it may be necessary or desirable to vary the frequency of the alternating voltage in order to achieve good energy coupling. Third, the spacing of the electrodes may be sized so as to prevent the inadvertent insertion of a finger or foreign object, thereby improving the safety of the appliance. Fourth, the spacing of the electrodes may be sized so as to achieve a relatively strong electric field between the electrodes whilst also avoiding arcing or corona discharge. Fifth, by having a fixed spacing, thermal conduction between the hair and the appliance may be reduced. By contrast, if the electrodes were moveable so as to clamp the hair, thermal conduction would be higher. As a result, the temperature of the appliance would increase, and the temperature of the hair would decrease, both of which are undesirable.

The spacing between the electrodes may be no greater than 10 mm. As a result, a relatively strong and localised electric field may be generated between the electrodes, which in turn leads to effective and efficient heating of the hair. Additionally, at this spacing, inadvertent insertion of fingers or foreign objects may be made more difficult, thereby improving the safety of the appliance.

The spacing between the electrodes may be no less than 1 mm. As a result, a relatively high voltage may be applied to the electrodes whilst avoiding arcing or dielectric breakdown. This then has the advantage that the electrodes may draw a given electrical power at a lower current, thereby improving the efficiency of the appliance.

The height of the chamber may be between 1 mm and 10 mm. As a result, thermal conduction between the hair and the chamber walls may be reduced. In particular, in contrast to a styling appliance in which the hair is clamped between plates, an air gap may be achieved between the hair and one or both of the chamber walls. This then has the benefit that excessive heating of the chamber walls may be avoided. Additionally, the hair may be heated more efficiently, with less thermal transfer occurring between the hair and the chamber walls.

The electrodes may be coated with or housed within a thermally insulating material, i.e. one having a thermal conductivity less than 1 W/m·K. As a result, thermal conduction between the hair and the appliance may be reduced. As noted above, this then has the benefit that excessive heating of the appliance may be avoided, and the hair may be heated more efficiently.

The appliance may comprise a body having a pair of prongs, and each of the electrodes may be attached to or housed within a respective prong. This then has the advantage that the appliance may be used to heat and style relatively wide sections of hair.

As noted above, there are advantages in having a relatively small spacing between the electrodes. However, this then inevitably leads to a chamber having a relatively low height. Feeding the hair into such a chamber may be difficult. Accordingly, an end of each of the prongs may be chamfered. This then has the benefit that hair may be gathered at the wider mouth of the prongs and then guided into the narrower chamber.

The appliance may comprise a pair of arms having an open position and a closed position, and the arms may grip the hair when in the closed position. This then has the advantage that, in spite of the electrodes having a fixed spacing, the hair may nevertheless be gripped, tensioned and manipulated by the appliance.

At least one of the arms may be moveable to vary a spacing between the arms without varying the spacing between the electrodes. This then has the advantage that the arms can be opened to a relatively wide position in order to gather and then guide the section of hair into the chamber. Once the hair is within the chamber, the arm(s) can then be moved to the closed position in order to grip the hair.

The electrodes may be attached to or housed within a body, the arms may be attached to the body, and at least one of the arms may be moveable relative to the body. This then provides an arrangement in which the electrodes are fixed and yet the arms are free to move between the open and closed positions. In one example, the arm(s) may be pivotally attached to the body. Additionally, the arms may be biased to the open position. This then provides a relatively convenient method for opening and closing the arms. For example, a user holding the appliance may squeeze the arms together in order to close the arms and grip the hair. The user may then pull down on the appliance in order to heat and style the full length of the hair. The user then releases the pressure on the arms, causing the arms to move to the open position.

The appliance may comprise a flexible membrane that extends between the body and the at least one of the arms. The membrane may then act to prevent the ingress of hair, dirt or debris between the arm and the body of the appliance.

At least one of the arms may comprise a gripping portion for gripping the hair, and the gripping portion may be formed of a resiliently deformable material. This then has the advantage that the gripping portion deforms to the shape of the hair and thus a more uniform gripping pressure (and therefore tension) may be applied across the width of the section of hair.

The gripping portion may be formed of a thermally insulating material, i.e. one having a thermal conductivity less than 1 W/m·K. As a result, thermal conduction between the hair and the appliance may be reduced.

BRIEF DESCRIPTION OF THE DRAWINGS

Embodiments will now be described, by way of example, with reference to the accompanying drawings in which.

DETAILED DESCRIPTION OF THE INVENTION

Figure 1:
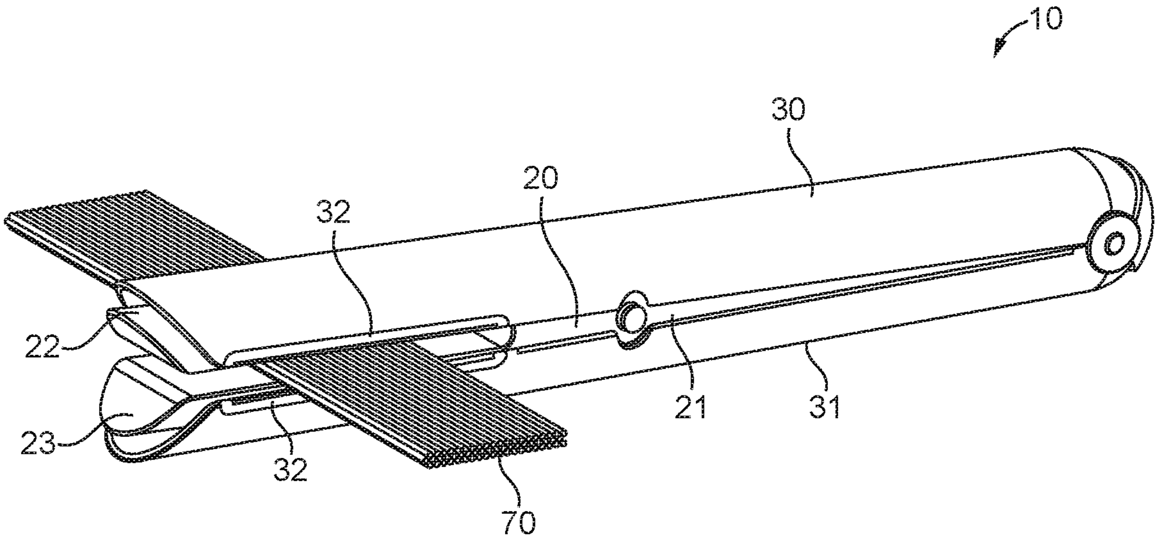
FIG. 1 is a perspective view of a first hair styling appliance in an open position.
Figure 2:
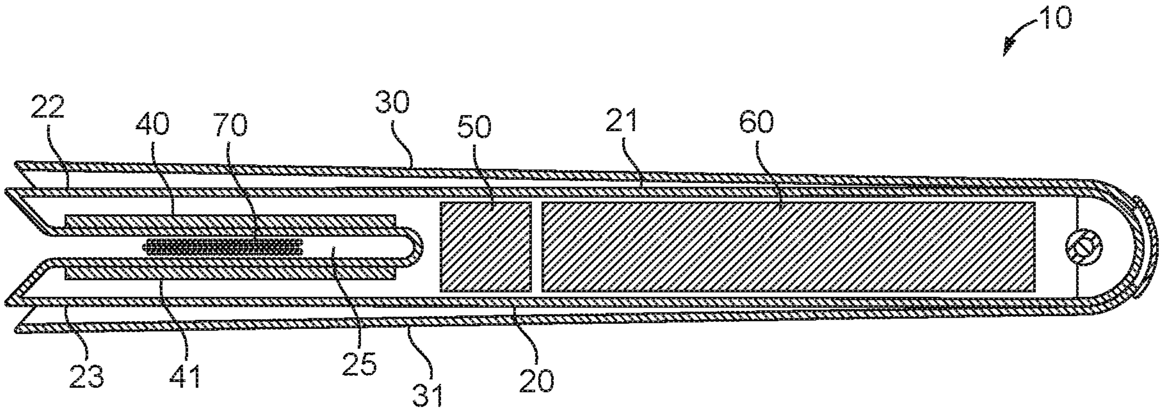
FIG. 2 is a side sectional view through the first hair styling appliance in the open position.
Figure 3:
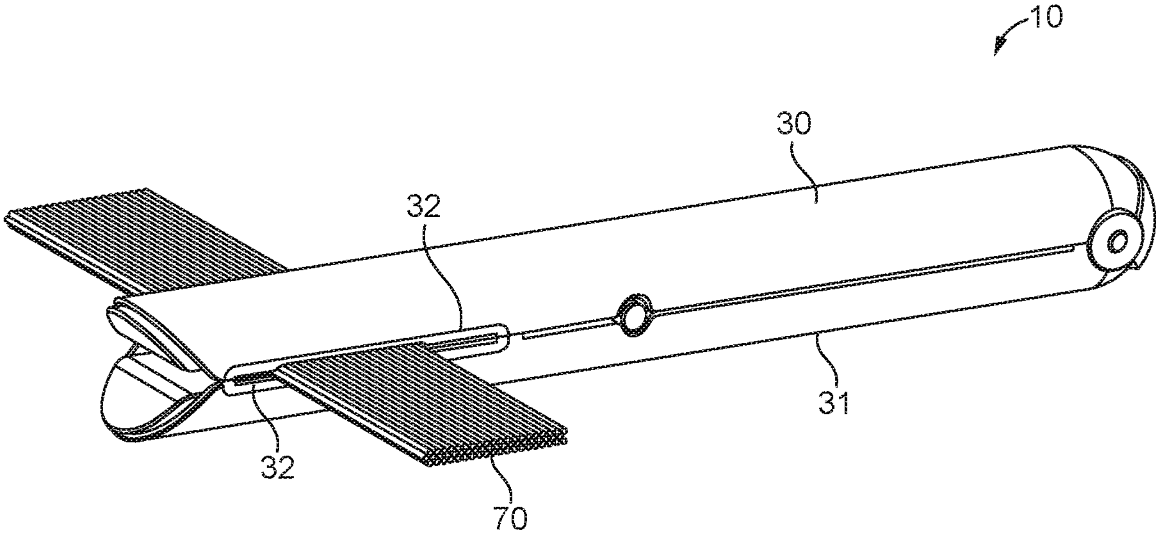
FIG. 3 is a perspective view of the first hair styling appliance in a closed position.
Figure 4:
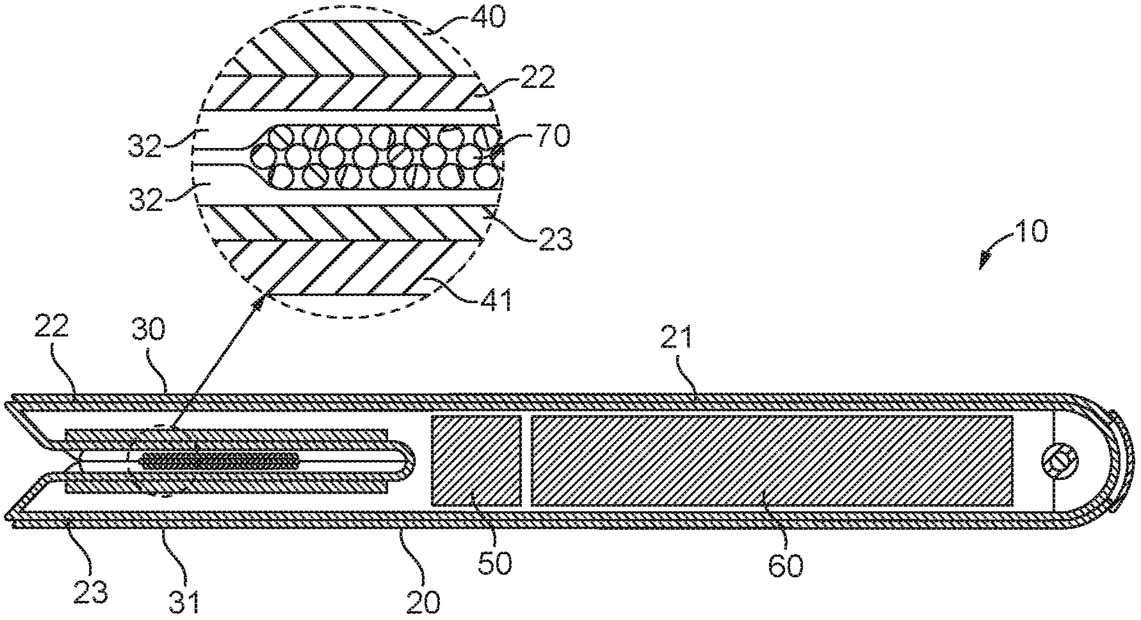
FIG. 4 is a side sectional view through the first hair styling appliance in the closed position.

The hair styling appliance 10 of FIGS. 1 to 4 comprises a body 20, a pair of arms 30,31, a pair of electrodes 40,41, a drive unit 50 and a battery 60.

The body 20 is generally elongated in shape and comprises a tubular section 21 and a pair of prongs 22,23 that extend from the tubular section 21. The tubular section 21 houses the drive unit 50 and the battery 60, and each of the prongs 22,23 houses one of the electrodes 40,41. A chamber 25 is defined between the two prongs 22,23 into which a section of hair 70 may be received. The free end of each of the prongs 22,23 is chamfered or bevelled. This then helps when inserting the section of hair 70 into the chamber 25. In particular, the hair 70 may be more easily gathered at the wider mouth of the prongs 22,23 and then guided into the narrower chamber 25.

Each of the arms 30,31 is pivotally attached to the body 20. The arms 30,31 roughly encapsulate the body 20, with each of the arms 30,31 overlying a respective prong 22,23. The arms 30,31 are moveable between an open position, shown in FIGS. 1 and 2, and a closed position, shown in FIGS. 3 and 4. The arms 30,31 are biased in the open position. When in the closed position, the arms 30,31 grip the section of hair 70 within the chamber 25. Each of the arms 30,31 comprises a gripping portion 32 for gripping the hair 70. The gripping portion 32 is formed of a resiliently deformable material, such as silicone, and deforms to the shape of the hair 70. As a result, the gripping pressure applied to the hair 70 by the arms 30,31 is more evenly distributed across the width of the section of hair 70. This then has the benefit that, when the arms 30,31 are in the closed position and the appliance 10 is pulled, a more even tension is created across the section of the hair 70.

Each of the electrodes 40,41 comprises a rectangular metal plate housed within one of the prongs 22,23 of the body 20. The electrodes 40,41 are arranged parallel to one another, with the chamber 25 located between the electrodes 40,41.

Figure 5:
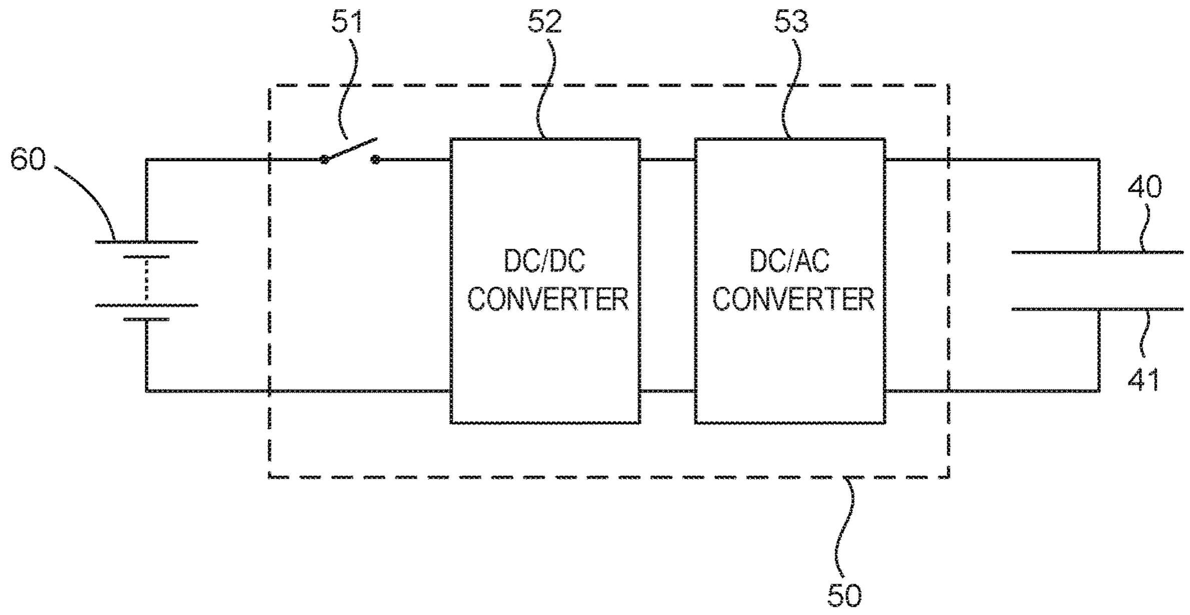
FIG. 5 is a block diagram of a drive unit forming part of the first hair styling appliance.

The drive unit 50 is coupled between the battery 60 and the electrodes 40,41, and is operable to apply an alternating voltage to the electrodes 40,41. As illustrated in FIG. 5, the drive unit 50 comprises comprise a switch 51, a DC-to-DC converter 52, and a DC-to-AC inverter 53.

The switch 51 is coupled between the battery 60 and the DC-to-DC converter 52. The state of the switch 51 depends on the position of the arms 30,31. When the arms 30,31 are in the open position, the switch 51 is open, and when the arms 30,31 are in the closed position, the switch 51 is closed. As a result, no voltage is applied to the electrodes 40,41 when the arms 30,31 are in the open position.

The DC-to-DC converter 52 is coupled between the switch 51 and the DC-to-AC inverter 53. When the switch 51 is closed, the DC-to-DC converter 52 converts the variable voltage of the battery 60 into a regular voltage. That is to say that, as the battery 60 discharges, the DC-to-DC converter 52 outputs a regular voltage to the DC-to-AC inverter 53. As explained below in more detail, the drive unit 50 is operable in a low-power mode and a high-power mode. When the drive unit 50 operates in low-power mode, the DC-to-DC converter 52 outputs a first voltage (e.g. 1 V) to the DC-to-AC inverter 53. When the drive unit 50 operates in high-power mode, the DC-to-DC converter 52 outputs a second, higher voltage (e.g. 50 V) to the DC-to-AC inverter 53. In one example, the DC-to-DC converter 52 may comprise a non-inverting buck-boost converter, which operates in buck mode to provide the first voltage and boost mode to provide the second, higher voltage.

The DC-to-AC inverter 53 is coupled between the DC-to-DC converter 52 and the electrodes 40,41. The DC-to-AC inverter 53 converts the DC voltage output by the DC-to-DC converter 52 into an AC voltage, which is applied to the electrodes 40,41. The AC voltage applied to the electrodes 40,41 has a frequency of between 10 MHZ and 100 MHZ (i.e. radio frequencies), which is typical for dielectric heating. However, lower or higher frequencies might equally be used.

In applying a voltage to the electrodes 40,41, an electric field is created between the two electrodes 40,41. Since the voltage applied to the electrodes 40,41 is alternating, the electric field also alternates. The electric field spans the chamber 25 and acts to heat the section of hair 70 within the chamber 25. In particular, the alternating field stimulates the oscillation of polar molecules within the hair, particularly water. The oscillation of the polar molecules in turn generates heat.

The amplitude of the AC voltage output by the DC-to-AC inverter 53 may be greater than the DC voltage output by the DC-to-DC converter 52. For example, where the DC-to-DC converter 52 outputs a DC voltage of 50 V, the DC-to-AC inverter 53 may output an AC voltage having an amplitude of 100 V. This then has the advantage of generating a stronger electric field (which is directly proportional to the applied voltage) between the electrodes 40,41, which in turn results in improved heating of the hair 70.

The DC-to-AC inverter 53 is a voltage source inverter and applies the same alternating voltage to the electrodes 40,41, irrespective of the impedance of the electrodes 40,41. The advantages of this arrangement are explained further below. Examples of suitable DC-to-AC inverters are described below with reference to FIGS. 15 to 18. However, other voltage source inverters capable of operating at MHz frequencies (e.g. push-pull class E power amplifiers) might alternatively be used.

The battery 60 is coupled to the drive unit 50 and supplies a DC voltage. In this particular example, the battery 60 comprises six cells, each having a voltage of 4.2 V when fully charged and 3.0 V when fully discharged. The battery 60 therefore outputs a voltage of between 25.2 V (fully charged) and 18.0 V (fully discharged). Rather than a battery, the appliance 10 might alternatively be powered by a mains power supply. In this instance, the drive unit 50 may comprise a rectifier and the DC-to-DC converter 52 may provide both power factor correction and isolation. For example, the DC-to-DC converter 52 may comprise a flyback converter.

The drive unit 50 is operable in one of three modes: power-off mode, low-power mode and high-power mode.

When the switch 51 is open, the drive unit 50 operates in power-off mode. No voltage and therefore no power is supplied to the electrodes 40,41. When the switch 51 is closed, the drive unit 50 transitions from power-off mode to low-power mode.

When operating in low-power mode, the drive unit 50 determines whether hair is present within the chamber 25. This may be achieved in a number of different ways. For example, the drive unit 50 may comprise an optical sensor, an ultrasonic sensor or capacitive sensor for sensing the presence of hair. Alternatively, the drive unit 50 may use the electrodes 40,41 to determine if hair is present. This then has the advantage that the presence of hair may be determined without the additional cost and complexity of integrating a sensor. The power supplied is electrical and the sensing is preferably electromagnetic.

The impedance of the electrodes 40,41 depends on the medium between the electrodes 40,41. In particular, the resistance is inversely proportional to the electrical conductivity of the medium, and the capacitance is directly proportional to the dielectric constant of the medium. The impedance of the electrodes 40,41 may therefore be used to determine if hair is present within the chamber 25.

In order to obtain a measure of the impedance of the electrodes 40,41, the drive unit 50 applies a first voltage to the electrodes 40,41. More particularly, the DC-to-DC converter 52 outputs a first DC voltage, which the DC-to-AC inverter 53 converts into a first AC voltage. For example, the first DC voltage may be 1 V and the first AC voltage may be 2 V. Since the DC-to-AC inverter 53 is a voltage source inverter, any changes in the impedance of the electrodes 40,41 may be sensed as changes in current drawn by the electrodes 40,41. Changes in the impedance of the electrodes 40,41 may also translate as changes in voltages at certain nodes within the DC-to-AC inverter 53. The drive unit 50 may therefore sense one or more electrical or electromagnetic parameters (e.g. current and/or voltage) that are indicative of the impedance of the electrodes 40,41, and then use these electrical or electromagnetic parameters to determine the presence of hair. For example, the drive unit 50 may determine the presence of hair based solely on the input current drawn from the battery 60 by the DC-to-DC converter 52. However, a more reliable determination may be achieved by additionally sensing the voltage at one or more nodes within the AC-to-DC inverter 53.

The amount of hair located between the electrodes 40,41 as well as the properties of the hair, such as moisture content, will affect the impedance of the electrodes 40,41. A relatively high electrode impedance suggests that there is no hair between the electrodes 40,41. By contrast, a relatively low impedance suggests that a foreign object, such as a metal hair clip, is between the electrodes 40,41. The drive unit 50 therefore determines that hair is present when the sensed electrical or electromagnetic parameter(s) lies within a certain range. That is to say that the drive unit 50 determines that hair is present when the sensed electrical or electromagnetic parameter is greater than a lower threshold and less than an upper threshold.

If the drive unit 50 determines that hair is not present, the drive unit 50 continues to operate in low-power mode. In the event that the drive unit 50 determines that hair is present, the drive unit 50 transitions from low-power mode to high-power mode.

In high-power mode, the drive unit applies a second, higher voltage to the electrodes 40,41. More particularly, the DC-to-DC converter 52 outputs a second higher DC voltage, which the DC-to-AC inverter 53 converts into a second higher AC voltage. For example, the second DC voltage may be 50 V and the second AC voltage may be 100 V. The electrical power drawn by the electrodes 40,41 is therefore significantly higher in high-power mode. With the example voltages provided, the electrical power drawn by the electrodes 40,41 (for a given impedance) in high-power mode is around 2500 times greater than that in low-power mode.

Whilst in high-power mode, the drive unit 50 continues to determine the presence of hair between the electrodes 40,41, e.g. by sensing an electrical or electromagnetic parameter(s) indicative of the impedance of the electrodes 40,41. In the event that the drive unit 50 determines that hair is no longer present between the electrodes 40,41, the drive unit 50 transitions from high-power mode to low-power mode.

During use of the appliance 10, a user may hold the appliance 10 in one hand and grip a section of hair 70 in the other hand. With the arms 30,31 biased in the open position, the section of hair 70 is inserted into the chamber 25, e.g. by sliding the prongs 22,23 over the section of hair 70. As noted above, the ends of the prongs 22,23 are chamfered. This then provides a larger opening into which the section of hair 70 may be inserted. With the arms 30,31 in the open position, the switch 51 of the drive unit 50 is open and the drive unit 50 operates in power-off mode.

With the section of hair 70 in the chamber 25, the user squeezes the arms 30,31 together, thereby causing the arms 30,31 to move to the closed position. With the arms 30,31 in the closed position, the section of hair 70 is gripped between the two arms 30,31. More particularly, the hair 70 is gripped between the gripping portions 32, which deform to create a more uniform gripping pressure across the width of the hair. With the arms 30,31 in the closed position, the switch 51 of the drive unit 50 is closed and thus the drive unit 50 transitions to low-power mode.

In low-power mode, the drive unit 50 applies the first AC voltage (e.g. 2 V) to the electrodes 40,41 and determines whether hair is present based on the impedance of the electrodes 40,41. Upon determining that hair is present, the drive unit 50 transitions to high-power mode. The drive unit 50 then applies the second, higher AC voltage (e.g. 100 V) to the electrodes 40,41, and the resulting electric field heats the hair 70.

The user may pull the appliance 10 along the full length of the section of hair 70. At the end of the pass, when the section of hair 70 has been pulled through the appliance 10, the drive unit 50 determines that hair is no longer present in the chamber 25 and transitions to low-power mode. The user then opens the arms 30,31 ready for the next section of hair, at which point the drive unit 50 transitions to power-off mode.

In employing three different modes of operation, the safety and/or the efficiency of the appliance 10 may be improved. For example, high-power mode is used to heat the hair within the chamber 25. Low-power mode, on the other hand, is used to verify that hair is present within the chamber 25 before transitioning to high-power mode. By first verifying that hair is present before applying the higher, second voltage to the electrodes 40,41, the safety and the efficiency of the appliance 10 may be improved. For example, if a finger or foreign object is inadvertently inserted into the chamber 25 between the electrodes 40,41, the drive unit 50 continues to operate in low-power mode. Although a voltage is applied to the electrodes 40,41 in low-power mode, the voltage is relatively low and is applied only in order to obtain a measure of the impedance of the electrodes 40,41. No noticeable heating therefore occurs and arcing across foreign objects is avoided. With nothing in the chamber 25 but air, the power drawn by the electrodes 40,41 in high-power mode would be relatively low. Nevertheless, the efficiency of the appliance 10 may be improved by only operating in high-power mode when hair is present. Similarly, the power drawn by the electrodes 40,41 in low-power mode is relatively low. However, further efficiencies may be gained by powering-off the electrodes (i.e. operating in power-off mode) when the arms 30,31 are in the open position.

The electrodes 40,41 are housed within the prongs 22,23 of the body 20, which do not move. As a result, the electrodes 40,41 have a fixed spacing. This then has several potential advantages. First, the strength of the electric field is inversely proportional to the electrode spacing. By having a fixed spacing, a more consistent field strength may be achieved with each use of the appliance 10, resulting in more consistent heating of the hair. By contrast, if the electrodes were moveable, the strength of the electric field may vary with use, and thus heating of the hair may be inconsistent. For example, heating may be lower with a larger spacing and higher with a smaller spacing. This inconsistent heating may then lead to poor user satisfaction. Second, the electrodes 40,41 remain parallel to one another at all times. As a result, the electric field is uniform along the length of the chamber 25. By contrast, if the electrodes were moveable (e.g. to clamp the hair), the electrodes may not be parallel during heating. The field strength would then vary (i.e. greatest where the electrodes are closest, and weakest where the electrodes are furthest), resulting in inconsistent heating of the hair. Third, by having a fixed electrode spacing, good coupling of the energy of the electric field with the hair may be achieved at a single alternating frequency, thus simplifying the drive unit 50. By contrast, if the electrodes were movable then, as the spacing varies, it may be desirable or indeed necessary to vary the frequency of the alternating voltage in order to achieve good energy coupling. Fourth, where the impedance of the electrodes 40,41 is used to determine whether hair is present in the chamber 25, a more reliable determination may be made. The impedance of the electrodes 40,41 depends on both the spacing of the electrodes 40,41 and the electrical characteristics (i.e. conductivity and dielectric constant) of the medium between the electrodes 40,41. Accordingly, by having a fixed electrode spacing, a more reliable determination of the type of medium may be made. Fifth, the electrode spacing may be sized so as to prevent the inadvertent insertion of a finger or foreign object, thereby improving the safety of the appliance 10. Sixth, the electrode spacing may be sized so as to achieve a relatively strong electric field whilst also avoiding arcing or corona discharge. Seventh, by having a fixed spacing, thermal conduction between the hair 70 and the appliance 10 may be reduced. By contrast, if the electrodes were moveable so as to clamp the hair, thermal conduction would be higher. As a result, the temperature of the appliance 10 would increase, and the temperature of the hair 70 would decrease, both of which are undesirable.

As already noted, the strength of the electric field depends on the electrode spacing. Accordingly, the spacing between the electrodes 40,41 may be no greater than 10 mm. As a result, a relatively strong and localised electric field may be generated between the electrodes 40,41, which in turn leads to effective and efficient heating of the hair 70. Additionally, at this spacing, inadvertent insertion of fingers or foreign objects may be made more difficult, thereby improving the safety of the appliance 10.

The breakdown voltage of the electrodes 40,41 (i.e. the voltage at which arcing or dielectric breakdown occurs)

depends on the electrode spacing. In particular, as the electrode spacing decreases, the breakdown voltage decreases. The spacing between the electrodes 40,41 may therefore be no less than 1 mm. As a result, a relatively high voltage may be applied to the electrodes 40,41 whilst avoiding arcing or dielectric breakdown. This then has the advantage that the electrodes 40,41 may draw a given electrical power at a lower current, thereby improving the efficiency of the appliance 10.

As the hair 70 is heated within the chamber 25, there is inevitably some thermal conduction between the hair 70 and the body 20 of the appliance 10. In particular, heat from the hair 70 is transferred to the body 20. As a result, the temperature of the body 20 increases, and the temperature of the hair 70 decreases, both of which are undesirable. The body 20, or at least that part of the body that contacts the hair 70, may therefore be formed of a thermally insulating material, i.e. one having a thermal conductivity less than 1 W/m·K. For example, the body 20 may be formed of PEEK or a thermoplastic having similar properties. This then has the benefit of reducing thermal conduction between the hair 70 and the body 20. As a result, excessive heating of the appliance 10 may be avoided, and the hair 70 may be heated more efficiently.

The chamber 25 may have a height of between 1 mm and 10 mm. By having a chamber 25 that is taller than the section of hair 70 being heated, an air gap may be achieved between the hair 70 and one or both of the walls of the chamber 25. As a result, thermal conduction between the hair 70 and the body 20 may be further reduced. As noted, this then has the benefit that excessive heating of the appliance 10 may be avoided, and the hair 70 may be heated more efficiently.

Like the body 20, the gripping portions 32 of the arms 30,31 may be formed of a thermally insulating material so as to further reduce thermal conduction between the hair 70 and the appliance 10. Furthermore, when the hair 70 is gripped between the arms 30,31 and tensioned, the section of hair 70 may be suspended in the middle of the chamber 25, thus creating an air gap both above and below the hair 70. Indeed, this is the situation illustrated in FIG. 4. This then has the benefit of further reducing thermal conduction between the hair 70 and the body 20 of the appliance 10.

Although not illustrated, the appliance 10 may comprise a flexible membrane that extends between each of the arms 30,31 and a respective prong 22,23 of the body 20. The membrane may help prevent the ingress of hair, dirt or debris between the arms 30,31 and the body 20.

The DC-to-AC inverter 53 is a voltage source inverter and applies the same alternating voltage to the electrodes 40,41, irrespective of the impedance of the electrodes 40,41. This then has a couple of advantages. First, the same electromagnetic field or electric field is generated irrespective of the amount of hair or the characteristics of the hair (e.g. moisture content) within the chamber 25. Second, by operating as a voltage source, the electrodes 40,41 are free to draw a current that depends on the impedance of the electrodes 40,41. For example, when the impedance is higher (e.g. when a small amount of hair is located in the chamber 25 or the hair is dry), a smaller current and therefore a smaller power is drawn by the electrodes 40,41. Conversely, when the impedance is lower (e.g. when a large amount of hair is located in the chamber 25 or the hair is damp), a higher current and therefore a higher power is drawn by the electrodes 40,41. The appliance 10 is therefore self-regulating in that the electrodes 40,41 automatically draw power according to the hair within the chamber 25. As a result, the efficiency of the appliance may be improved and/or more consistent heating may be achieved. By contrast, if the drive unit 50 were to include a current source inverter or a power source inverter, the electrodes 40,41 would draw the same current or power irrespective of the impedance of the electrodes 40,41. Consequently, when there is a small amount of hair in the chamber 25, excessive heating of the hair and/or arcing across the electrodes 40,41 may occur. Conversely, when there is a large amount of hair in the chamber 25, heating of the hair may be relatively poor.

A further advantage of providing a voltage source inverter is that effective coupling of the energy of the electric field with the hair may be achieved at a single frequency, irrespective of changes in the impedance of the electrodes 40,41 (i.e. irrespective of the amount or characteristics of the hair). By contrast, with an inverter that operates as a current source or power source, it may be desirable or indeed necessary to apply a voltage at different frequencies in order to achieve effective energy coupling and/or and avoid excessively high voltages across the electrodes. Furthermore, the impedance of the electrodes 40,41 depends on the frequency of the alternating voltage. Accordingly, where the impedance of the electrodes 40,41 is used to determine whether hair is present in the chamber 25, a more reliable determination may be made when a voltage having a fixed frequency is applied to the electrodes 40,41.

With the appliance described above, the hair 70 may be gripped and tensioned by the arms 30,31 without varying the relative positions of the electrodes 40,41, the advantages of which have already been described. In the embodiment described above, both arms 30,31 are moveable. However, the same benefits may be achieved by having just one arm that is moveable. For example, the lower arm 31 may be fixed to the body 20, and the upper arm 30 may be moveable relative to the body 20 (and thus the electrodes 40,41). Indeed, the lower arm 31 could conceivably be omitted altogether and the hair 70 may be gripped between the upper arm 30 and the body 20. Having just one moveable arm may make it easier to access the roots of the section of hair. In particular, the shallower, fixed part of the appliance 10 may be held against the scalp of the user, and the upper arm 30 may then be brought down to grip and tension the hair.

In the embodiment described above, the electrodes 40,41 are housed within the body 20 of the appliance 10. More specifically, each electrode 40,41 is housed within a respective prong 22,23. Conceivably, the electrodes 40,41 may be secured to the surface of the body 20, i.e. the surface of a respective prong 22,23. Each electrode 40,41 is then coated or covered with an electrical insulating material to prevent potential shorting across the electrodes 40,41 and to minimise the risk of arcing. The coating or covering may also be a thermally insulating material, so as to reduce thermal conduction between the hair and the appliance 10.

The body 20 of the appliance 10 comprises a pair of prongs 22,23 to which the electrodes 40,41 are housed or otherwise secured. A chamber 25 is then defined between the electrodes 40,41 into which the hair is received. As noted above, there are advantages in having a chamber 25 that is relatively shallow. However, having a shallow chamber (e.g. one having a height of between 1 mm and 10 mm) may present challenges when trying to insert a relatively thick section of hair into the chamber 25. In order to mitigate this difficulty, the prongs 22,23 of the body 20 may be moveable between an open position and a closed position. For example, the prongs 22,23 may pivot between the open position and the closed position.

Figure 6:
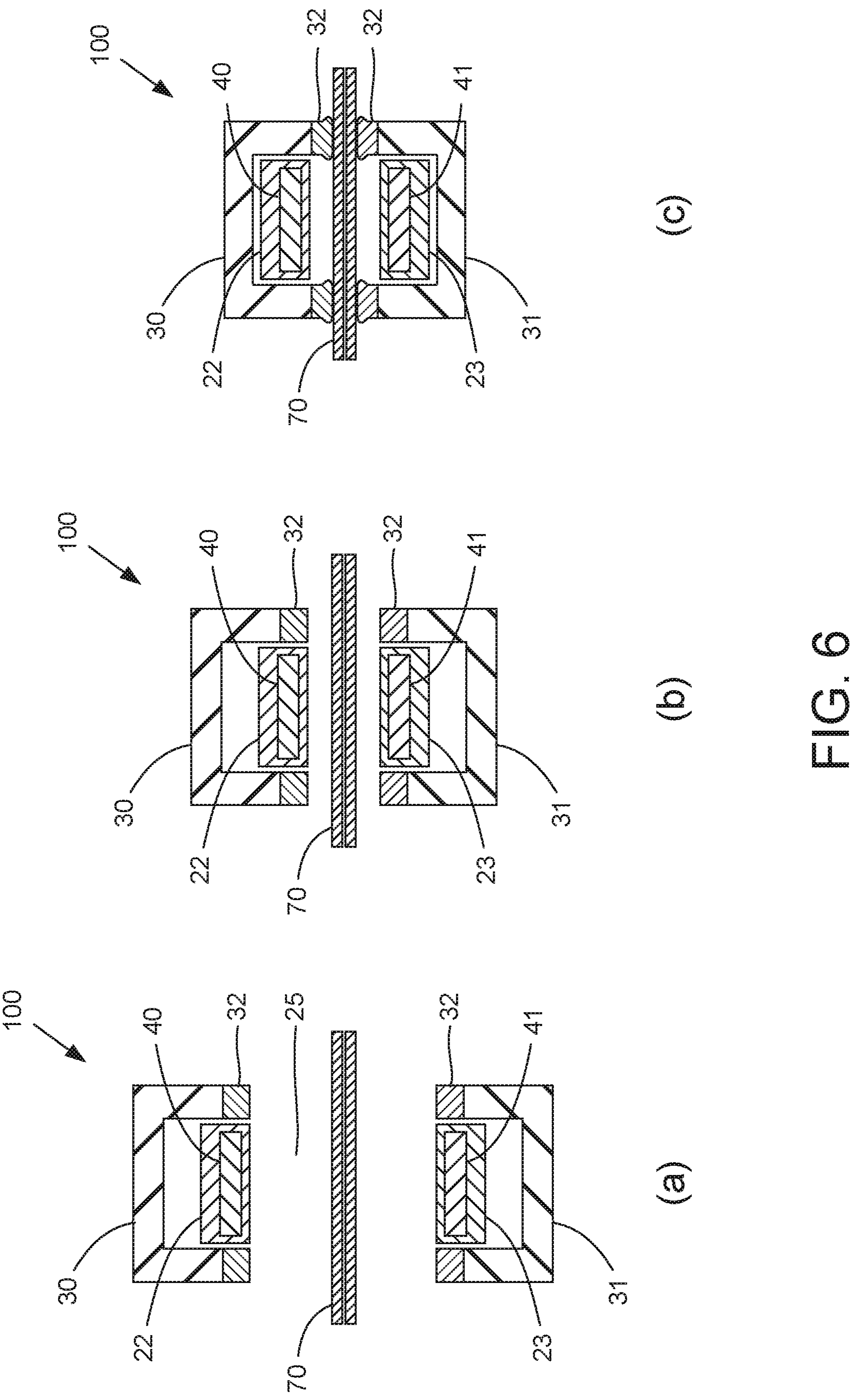
FIG. 6 is a front sectional view through a second hair styling appliance (a) in an open position, (b) in a position partway between open and closed, and (c) in a closed position.

FIG. 6 illustrates an example of a hair styling appliance 100 having prongs 22,23 that pivot between an open position and a closed position. When the arms 30,31 are in the open position, as shown in FIG. 6(*a*), the prongs 22,23 are also in the open position. As a result, a relative wide mouth to the chamber 25 is achieved, thus making it easier to gather and insert a section of hair 70 into the chamber 25. As the arms 30,31 are moved to their closed position, the prongs 22,23 also move. When the prongs 22,23 reach a predefined spacing, as shown in FIG. 6(*b*), further movement of the prongs 22,23 is prevented. The prongs 22,23 therefore have a predefined spacing when in the closed position. The arms 30,31, however, continue to move relative to the prongs 22,23 until they reach their closed position, shown in FIG. 6(*c*), at which point the arms 30,31 grip the hair. The prongs 22,23 and thus the electrodes 40,41 have a predefined spacing when in the closed position. Accordingly, the advantages noted above regarding a fixed electrode spacing and/or a shallow chamber height continue to be achieved. However, the appliance 100 has the additional benefit of providing a wider mouth to the chamber 25 when in the open position, thus making it easier to insert a section of hair 70 into the chamber 25.

Figure 7:
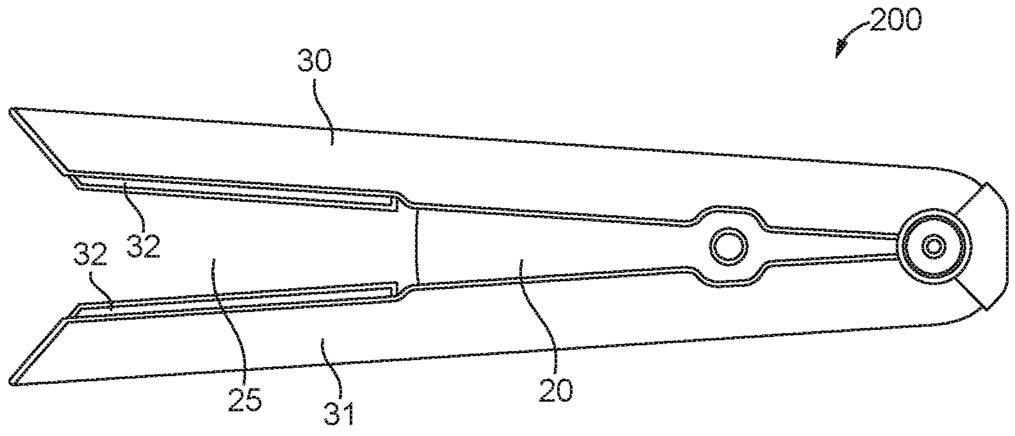
FIG. 7 is a side view of a third hair styling appliance in an open position.
Figure 8:
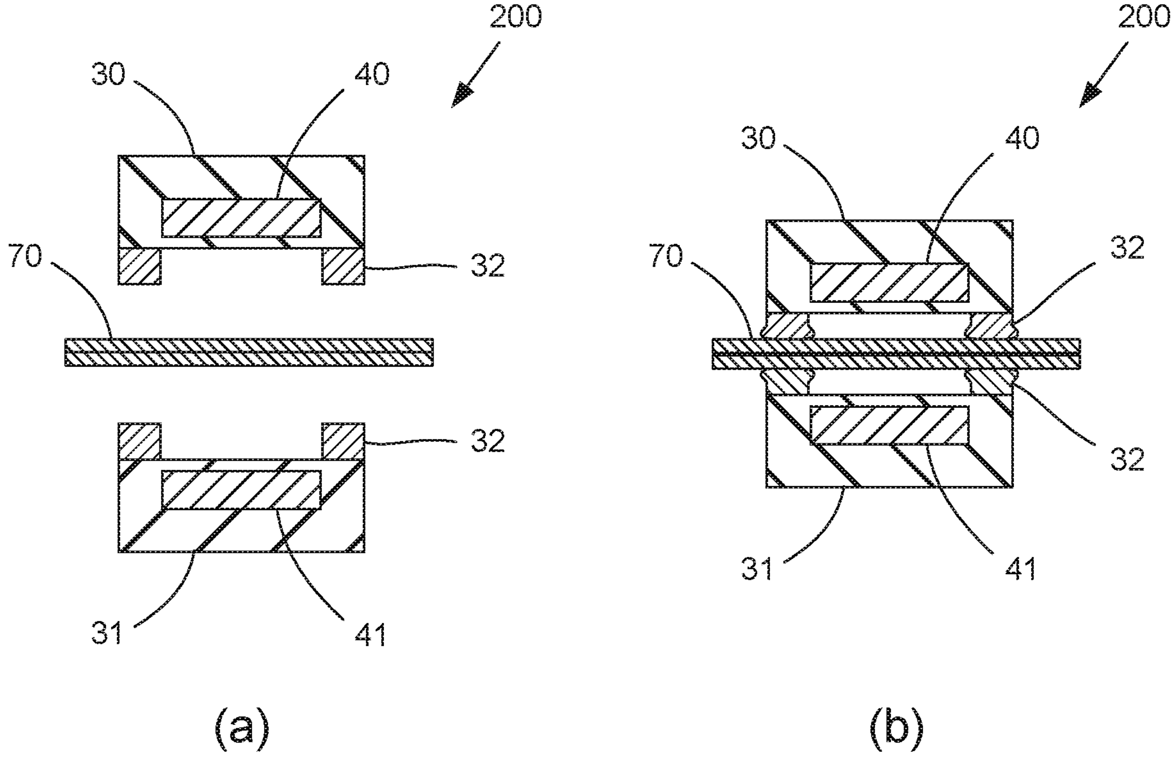
FIG. 8 is a front sectional view through the third hair styling appliance (a) in the open position and (b) in a closed position.

FIGS. 7 and 8 illustrate an alternative hair styling appliance 200 in which the prongs are omitted from the body 20, and the electrodes 40,41 are instead housed within the arms 30,31 of the appliance 100. The chamber 25 is then defined between the two arms 30,31. This then has the advantage that, when the arms 30,31 are in the open position, as shown in FIGS. 7 and 8(*a*), the chamber 25 has a relatively wide mouth for receiving a section of hair 70. When the arms 30,31 are moved to the closed position, as shown in FIG. 8(*b*), the gripping portions 32 deform to grip the hair 70.

The electrodes 40,41 have a predefined minimum spacing when the arms 30,31 are in the closed position, there is no hair between the arms 30,31, and no gripping pressure is applied to the arms 30,31. During use, however, the actual spacing between the electrodes 40,41 may be slightly less than or greater than the predefined minimum spacing. For example, if the arms 30,31 are squeezed together and the gripping portions 32 are compressed with little or no hair between them, then an electrode spacing slightly smaller than the predefined minimum spacing may be obtained. Conversely, if the arms 30,31 are used to grip a relatively thick section of hair, then an electrode spacing slightly greater than the predefined minimum spacing may be obtained. If the electrode spacing is too great then the drive unit 50 may operate in power-off mode such that no voltage is applied to the electrodes 40,41. Although some of the advantages noted above in connection with a fixed electrode spacing may not be realised, many of the other advantages are. For example, as is evident from FIG. 8(*b*), it is still possible to achieve an air gap above and below the hair 70, thereby reducing thermal conduction from the hair 70 to the appliance 200.

FIGS. 9 to 12 illustrate a further alternative hair styling appliance 300 which, like the appliances described above, heat the hair dielectrically. The hair styling appliance 300 comprises a body 20, an arm 30, a plurality of electrodes 44, a drive unit 50 and a battery 60.

The body 20 is generally elongated in shape and comprises a tubular section 21 and a single prong 23 that extends from the tubular section 21. The tubular section 21 houses the drive unit 50 and the battery 60. The prong 23 comprises a plurality of projections 24, each of which houses one of the electrodes 44. The prong 23 additional comprises a plurality of channels 26 for receiving a section of hair 70, each channel 26 being defined between an adjacent pair of projections 24.

Figure 9:
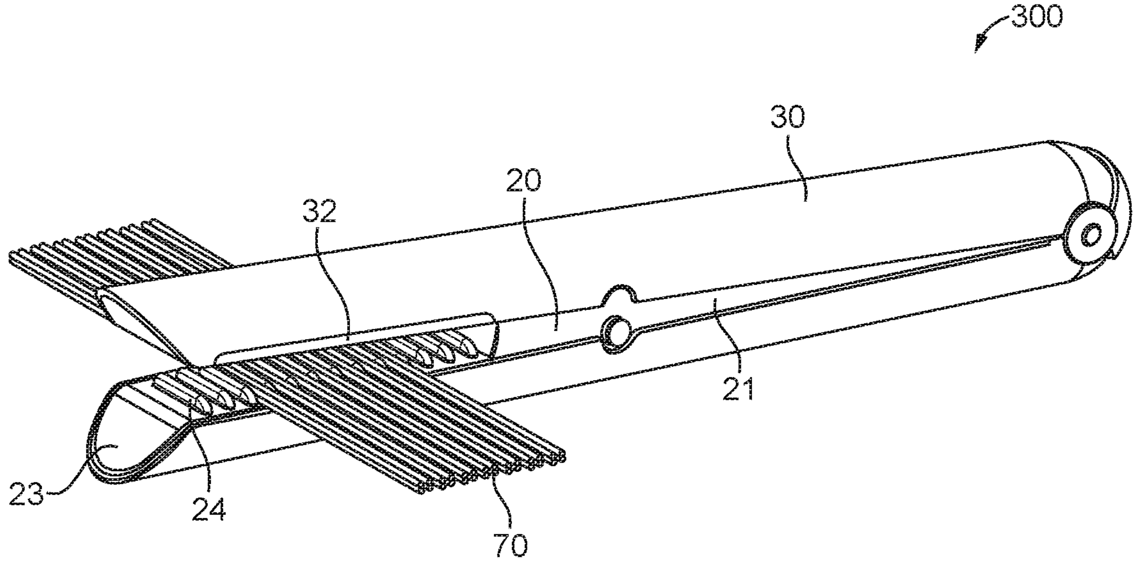
FIG. 9 is a perspective view of a fourth hair styling appliance in an open position.
Figure 10:
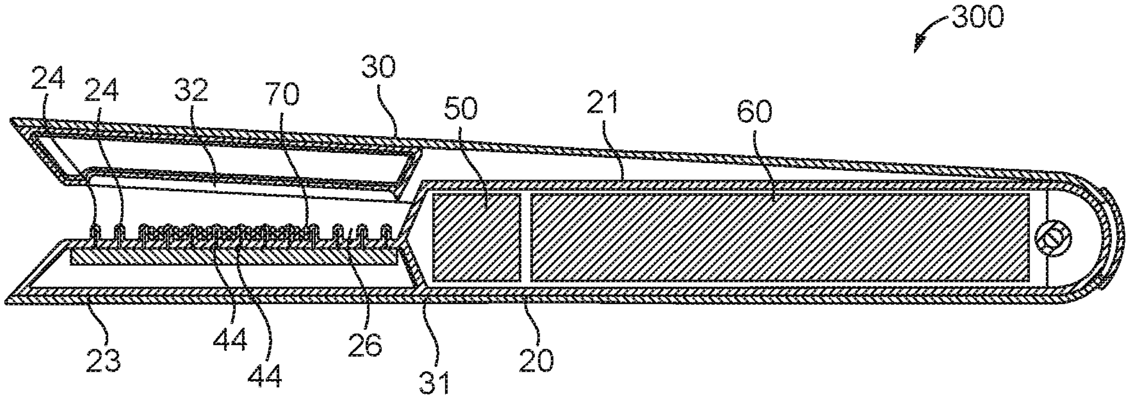
FIG. 10 is a side sectional view through the fourth hair styling appliance in the open position.
Figure 11:
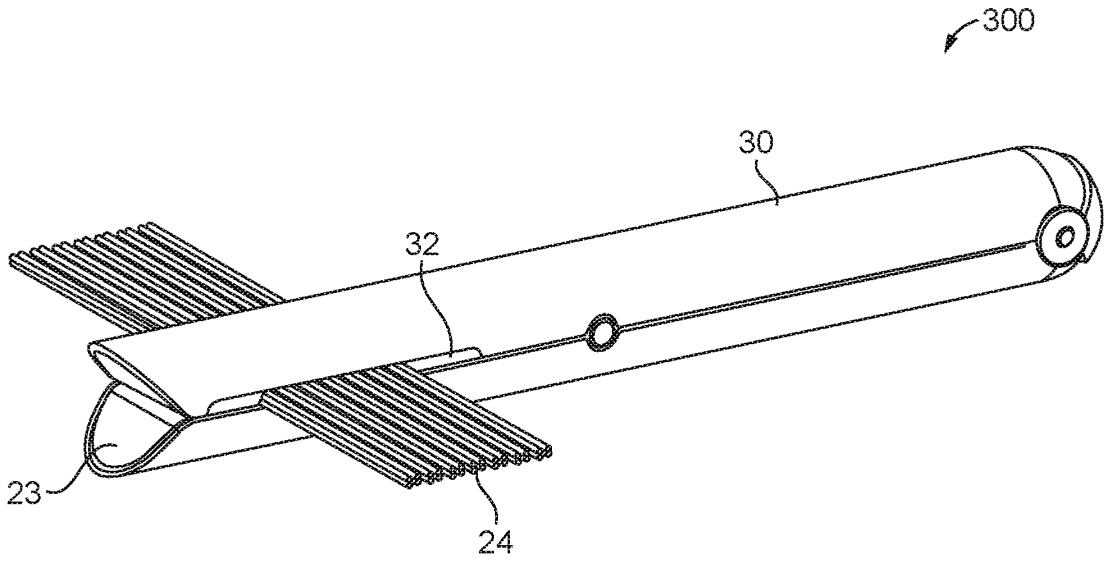
FIG. 11 is a perspective view of the fourth hair styling appliance in a closed position.
Figure 12:
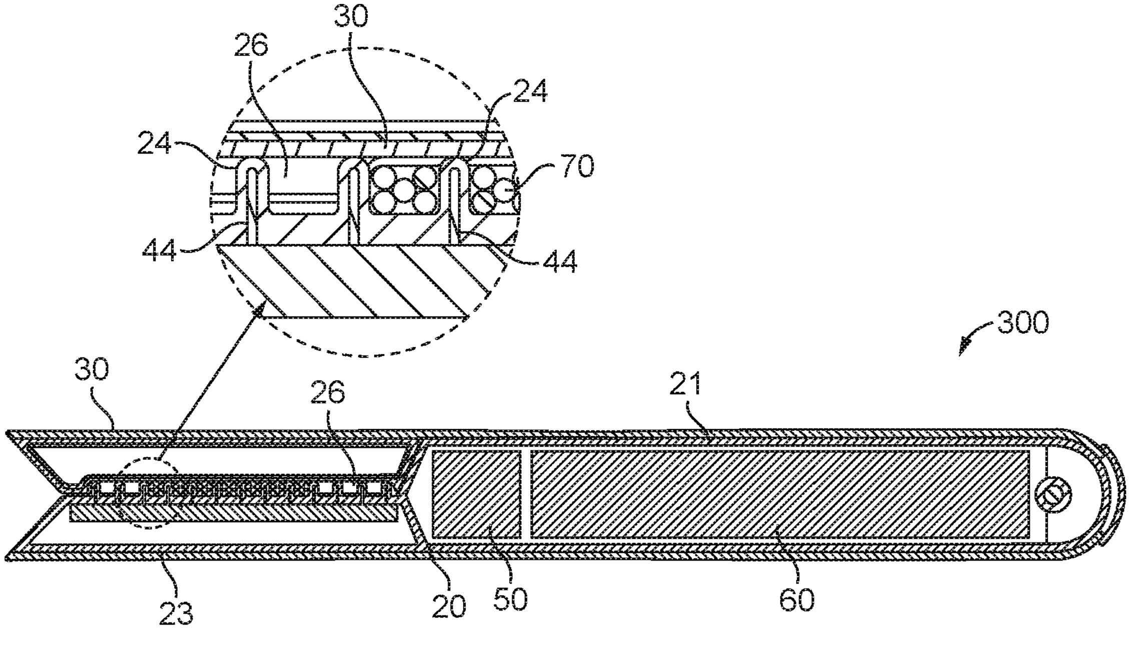
FIG. 12 is a side sectional view through the fourth hair styling appliance in the closed position.

The arm 30 is pivotally attached to the body 20 and is moveable between an open position, shown in FIGS. 9 and 10, and a closed position, shown in FIGS. 11 and 12. The arm 30 is biased in the open position. When the arm 30 is in the closed position, the section of hair 70 is gripped between the arm 30 and the prong 23. As with the appliances described above, the arm 30 comprises a gripping portion 32 for gripping the hair 70. The gripping portion 32 is formed of a resiliently deformable material (e.g. silicone) and deforms to the shape of the hair so as to create a more uniform gripping pressure across the width of the section of hair 70.

Each of the electrodes 44 comprises a metal plate housed within one of the projections 24 of the body 20. The electrodes 44 are arranged parallel to one another, with each of the channels 26 being located between an adjacent pair of electrodes 44.

The drive unit 50 and the battery 60 are unchanged from the appliance 10 described above and illustrated in FIGS. 1 to 5. The drive unit 50 therefore comprises a switch 51, a DC-to-DC converter 52, and a DC-to-AC inverter 53. In the arrangement shown in FIG. 5, the drive unit 50 is coupled to a single pair of electrodes 40,41. With the appliance 300 of FIGS. 9 to 12, the drive unit 50 is coupled to a plurality of electrodes 44. The odd numbered electrodes are therefore coupled to one of the terminals (e.g. live) of the DC-to-AC inverter 53, and the even numbered electrodes are coupled to the other of the terminals (e.g. neutral).

Operation of the appliance 300 is somewhat similar to that of the other appliances described above. In particular, a user holds the appliance 300 in one hand and grips a section of hair 70 in the other hand. With the arm 30 biased in the open position, the section of hair 70 is inserted between the arm 30 and the prong 23, and into the channels 26 of the appliance 300. With the arm 30 in the open position, the switch 51 of the drive unit 50 is open and the drive unit 50 operates in power-off mode. The user then squeezes the arm 30 and the prong 23 together, causing the arm 30 to move to the closed position. With the arm 30 in the closed position, the section of hair 70 is gripped between the arm 30 and the prong 23. More particularly, the hair 70 is gripped between the gripping portion 32 of the arm 30 and the prong 23. The switch 51 of the drive unit 50 is now closed and thus the drive unit 50 operates in low-power mode. The drive unit 50 determines whether hair is present in the channels 26 based on the impedance of the electrodes 44. Upon determining that hair is present, the drive unit 50 transitions to high-power mode. The drive unit 50 then applies the second AC voltage to the electrodes 44, and the resulting electromagnetic fields heat the hair 70.

The user is able to pull the appliance 300 along the full length of the section of hair 70. As the user does so, the projections 24 perform a secondary function by acting as bristles that detangle the hair and improve hair alignment. At the end of the pass, when the section of hair 70 has been pulled through the appliance 300, the drive unit 50 determines that hair is no longer present in the channels 26 and transitions to low-power mode. The user then opens the arm 30 ready for the next section of hair, at which point the drive unit 50 transitions to power-off mode.

With the appliance 300 of FIGS. 9 to 12, the electrodes 44 again have a fixed spacing, the advantages of which have been described above. However, in contrast to the appliance 10 of FIGS. 1 to 4, the appliance 300 has a relatively wide opening or mouth into which the section of hair 70 may be fed. A further advantage of the appliance 300 of FIGS. 9 to 12 is that a relatively small electrode spacing may be employed without hampering or impeding the insertion of the hair into the appliance 300. A smaller electrode spacing has the advantage that a relatively strong yet localised electric field may be generated within each channel 26, which in turn leads to effective and efficient heating of the hair.

As noted above, the strength of the electric field between each pair of electrodes 44 depends on the electrode spacing. Accordingly, the spacing between each pair of electrodes 44 may be no greater than 10 mm. As a result, a relatively strong and localised electric field may be generated between the electrodes 44. Additionally, at this spacing, inadvertent insertion of fingers or foreign objects may be made more difficult, thereby improving the safety of the appliance 300.

The electrodes 44 may have a projected height of between 2 mm and 10 mm. That is to say that the height of each electrode 44 which projects above the surface of the body 20 and provides heating within the channels 26 is between 2 mm and 10 mm. This range provides a good balance between heating and efficiency. If the electrodes 44 were shorter than 2 mm, heating of the hair may be less effective particularly for relatively thick sections of hair. On the other hand, if the electrodes 44 were taller than 10 mm, heating of the hair may be less efficient since, on most occasions, the channels 26 are likely to have a low fill factor (i.e. the fraction of each channel 26 occupied by hair is likely to be low).

The electrodes 44 may have a length of at least 10 mm. As a result, a given cross-sectional area for each electrode 44 may be achieved for a lower electrode height. This then has the advantage that effective heating of the hair may be achieved with shallower, more localised electromagnetic fields.

Although heating of the hair may be achieved with a relatively small number of projections and electrodes, there are advantages in having a relatively high number of projections 24. To this end, the appliance 300 may comprise at least ten projections 24. In the particular example illustrated in FIGS. 9 to 12, the appliance 300 comprises thirteen projections 24. This then has the advantage that the appliance 300 may be used to heat a relatively wide section of hair. Additionally, for a given width of heating, a smaller spacing between the electrodes 44 may be achieved. As noted above, this then has the advantage that a relatively strong yet localised electric field may be generated within each channel 26. Furthermore, a relatively high number of projections 24 aids in detangling the hair.

When the arm 30 is in the closed position, an air gap may be created above the hair. As a result, thermal conduction between the hair 70 and the body 20 may be reduced. As noted, this then has the benefit that excessive heating of the body 20 may be avoided, and the hair 70 may be heated more efficiently. As with the other appliances described above, the body 20 and the gripping portion 32 may be formed of a thermally insulating material (e.g. PEEK in the case of the body 20, and silicone in the case of the gripping material 32) in order to further reduce the transfer of heat from the hair 70 to the appliance 300.

Figure 13:
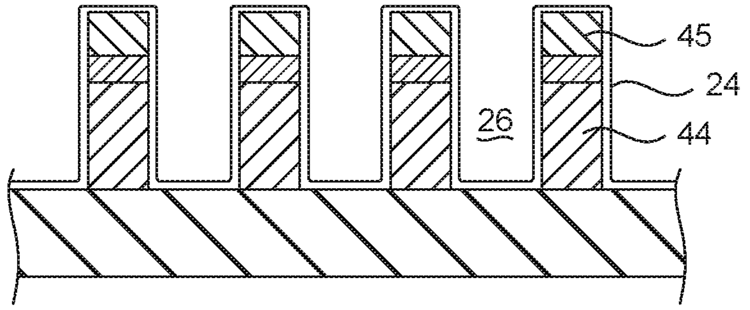
FIG. 13 illustrates an alternative electrode configuration for use with the fourth hair styling appliance.

When a voltage is applied to the electrodes 44, fringe fields radiate from the top of each electrode 44. Owing to their direction, the fringe fields are unlikely to provide any useful heating of the hair. Accordingly, as illustrated in FIG. 13, each of the projections 24 may comprise a further electrode 45 located above the electrode 44. The further electrode 45 may be grounded such that the fringe field from the electrode 44 is attenuated by the further electrode 45. Attenuating the fringe fields in this way has the advantage that the electromagnetic fields and thus heating may be better confined to the channels 26.

In the particular embodiment illustrated in FIGS. 9 to 12, the projections 24 are formed by the body 20, with each projection 24 housing an electrode 44. In an alternative embodiment, the body 20 may comprise slots through which the electrodes 44 project to create the projections. Each electrode 44 is then coated or covered with an electrical insulating material to prevent potential shorting across the electrodes and to minimise the risk of arcing. The coating or covering may also be a thermally insulating material, so as to reduce thermal conduction between the hair and the appliance.

In each of the appliances 10,100,200,300 described above, the arm or arms 30,31 pivot when moving from between the open and closed positions. Conceivably, the arm(s) 30,31 may move in other ways between the open and closed positions. For example, the arm(s) 30,31 may move linearly (e.g. translate up and down) relative to the body 20.

The hair styling appliances 10,100,200,300 described thus far resemble a hair straightener or flat iron. However, features of the appliances described above may be applied to other types of hair styling appliances. By way of example, FIG. 14 illustrates a further hair styling appliance 400 which, again, heats the hair dielectrically.

Figure 14:
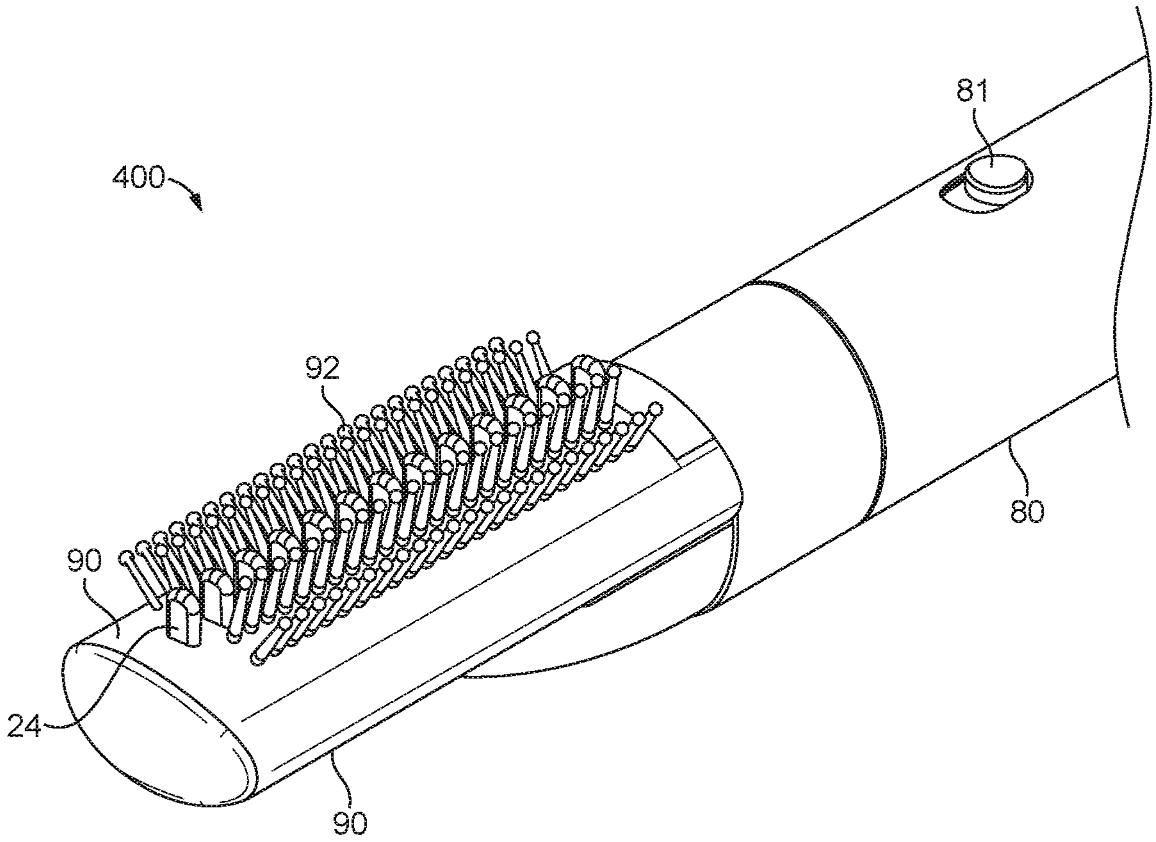
FIG. 14 is a perspective view of a fifth hair styling appliance.

The hair styling appliance 400 of FIG. 14 comprises a handle unit 80 to which an attachment 90 is removably attached. A drive unit and a battery are housed within the handle unit 80. The attachment 90 comprises a main body 91 from which a plurality of bristles 92 and a plurality of projections 24 project. As with the appliance 300 of FIGS. 9 to 12, each of the projections 24 houses an electrode, which is coupled to the drive unit.

The drive unit may again operate in one of three modes: power-off mode, low-power mode, and high-power mode. The handle unit 80 comprises a slider 81 or other user control, which a user can actuate in order to power on and off the appliance 400. The switch of the drive unit is then opened or closed according to the position of the slider 81.

The appliance 400 is intended to be used in a brushing action, with the bristles 92 acting to detangle and align the strands of hair. The electrodes then simultaneously heat the hair. As a result, a smoother, straighter and/or flatter finish to the hair may be achieved. The bristles 92 project beyond the projections 24, which is to say that the bristles 92 are taller than the projections 24. The taller bristles 92 are then able to penetrate more deeply into the hair such that smoothing may be achieved in a fewer number of passes.

In both the appliance 300 of FIGS. 9 to 12 and the appliance 400 of FIG. 14, the projections 24 may be said to extend in directions normal to the longitudinal axis of the body 20,91, i.e. the axis extending along the length of the body. This then has the advantage that, during use, the appliance 300,400 may be held with the length of the body 20,91 (and thus the longitudinal axis) in a generally horizontal position. The projections 24, which extend normal to the longitudinal axis, are then oriented vertically. Accordingly, the appliance 300,400 may be pulled downwards through the section of hair, with the protrusions 24 acting to detangle the hair.

With each of the appliances 10,100,200,300,400 described above, hair is heated dielectrically. Consequently, in contrast to a conventional styling appliance having heating plates, the hair may be heated without first having to heat a surface of the appliance. The appliance is therefore potentially safer since it is not necessary to heat the appliance to temperatures of around 200° C. The temperature of the appliance may increase during use. However, any temperature increase arises from the transfer of heat from the hair to the appliance, rather than the other way around. In comparison to a conventional styling appliance having resistive heating plates, the appliance is potentially more efficient. With a conventional styling appliance, the electrical power drawn by the heating plates can be significant even when there is no hair between the plates. With the present appliance, on the other hand, relatively little power is likely to be drawn by the electrodes in the absence of hair. This is because the power drawn by the electrodes depends on the impedance of the electrodes, which in turn depends on the dielectric constant of the material between the electrodes. The dielectric constant of air is around 1 and therefore, in the absence of hair, the power drawn by the electrodes is likely to be relatively low.

Figure 15:
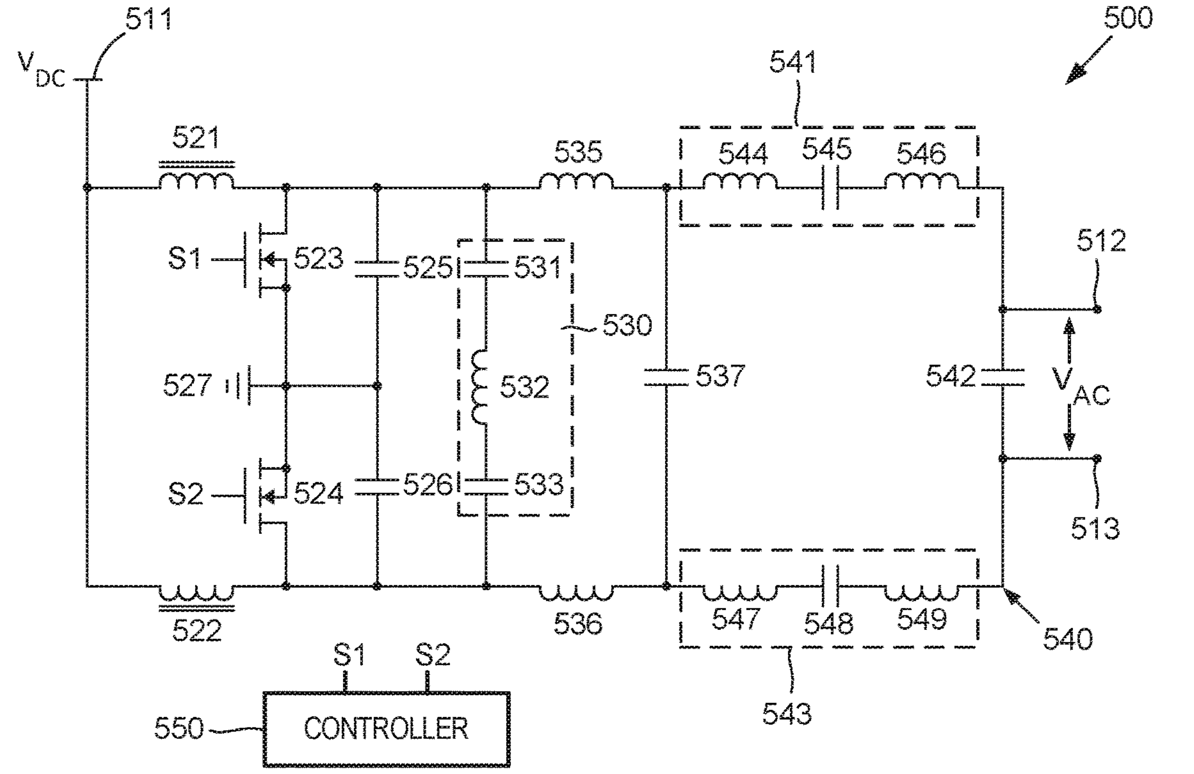
FIG. 15 is a circuit diagram of an AC-to-DC inverter.

FIG. 15 illustrates an example of an AC-to-DC inverter 500 suitable for use with the above-described appliances 10,100,200,300,400.

The AC-to-DC inverter 500 comprises an input 511 for connection to the DC-to-DC converter of the drive unit, and a pair of outputs 512,513 for connection to the electrodes.

The AC-to-DC inverter 500 further comprises a first inductor 521, a second inductor 522, a first switch 523, and second switch 524, a first capacitor 525 and a second capacitor 526. Each of the inductors 521,522 has a first terminal connected to the input 511 and a second terminal. The first switch 523 has a first terminal connected to the second terminal of the first inductor 521 and a second terminal connected to ground 527. Similarly, the second switch 524 has a first terminal connected to the second terminal of the second inductor 522 and a second terminal connected to ground 527. The first inductor 521 and the first switch 523 are therefore connected in series between the input 511 and ground 527. Similarly, the second inductor 522 and the second switch 524 are connected in series between the input 511 and ground 527. The first capacitor 525 is then connected in parallel to the first switch 523, and the second capacitor 526 is connected in parallel to the second switch 524.

The AC-to-DC inverter 500 also comprises a first network 530, a fourth inductor 535, a fifth inductor 536, and a fifth capacitor 537. The first network 530 has a first terminal connected to the first terminal of the first switch 523 and a second terminal connected to the first terminal of the second switch 524. The first network 530 comprises a third capacitor 531, a third inductor 532 and a fourth capacitor 533 connected in series. The fourth inductor 535 has a first terminal connected to the first terminal of the first network 530 and a second terminal connected to a first terminal of the fifth capacitor 537. The fifth inductor 536 has a first terminal connected to the second terminal of the first network 530 and a second terminal connected to the second terminal of the fifth capacitor 537. The fifth capacitor 537 therefore has a first terminal connected to the second terminal of the fourth inductor 535, and a second terminal connected to the second terminal of the fifth inductor 536.

The AC-to-DC inverter 500 further comprises a second network 540 having a first terminal connected to the first terminal of the fifth capacitor 537 and a second terminal connected to the second terminal of the fifth capacitor 537. The second network 540 comprises a first sub-network 541, an output capacitor 542, and a second sub-network connected 543 in series. Each of the sub-networks 541,543 comprises an inductor 544,547, a capacitor 545,548 and a further inductor 546,549 connected in series. The particular order of the components within each sub-network 541,543 is unimportant. Additionally, since the inductor 544,547 and the further inductor 546,549 are connected in series, each sub-network 541,543 could conceivably comprise a single inductor (corresponding to the sum of the two inductors). Each of the outputs 512,513 is connected to a terminal of the output capacitor 542, i.e. a first output 512 is connected to a first terminal of the output capacitor 542, and a second output 513 is connected to a second terminal of the output capacitor 542.

Finally, the AC-to-DC inverter 500 comprises a controller 550 for controlling the first and second switches 523,524, and thus the operation of the AC-to-DC inverter 500. The controller 550 generates switching signals S1, S2 for controlling the switches 523,524. Although not shown, the AC-to-DC inverter 500 may comprise gate drivers for driving the switches 523,524 in response to the switching signals S1,S2 generated by the controller 550.

In operation, the controller 550 switches each of the switches at a duty cycle of 0.5. Moreover, the switching signal S2 of the second switch 524 is phase shifted by 180 degrees relative to the switching signal S1 of the first switch 523. In response, an AC output voltage is generated at the outputs 512,513.

The frequency of the output voltage is defined by the switching frequency of the switches 523,524. The controller 550 switches the switches 523,524 at a switching frequency in the MHz region, resulting in an output voltage having a MHz frequency. The controller 500 may switch the switches at a switching frequency of between 10 MHz and 100 MHz.

Owing to the particular topology of the AC-to-DC inverter 500, the output voltage has a constant amplitude and phase. That is to say that, for a given input voltage, the amplitude and phase of the output voltage is constant. Moreover, the amplitude and phase of the output voltage remain constant in response to changes in the load.

The power inverter 1 therefore acts as a voltage source, the advantages of which have been described above.

In addition to generating an output voltage that (i) has a frequency in the MHz region, and (ii) has a constant amplitude and phase, the components the AC-to-DC inverter 500 shape the voltage across each of the switches 523,524 such that zero or near-zero voltage switching may be achieved. As a result, relatively high efficiencies may be achieved at MHz frequencies.

Inverters that employ conventional full-bridge topologies are typically efficient at kHz frequencies. However, as the frequency of operation increases to MHz, switching losses can increase significantly and parasitic inductances and capacitances may limit the performance. The AC-to-DC inverter described here, on the other hand, comprises a single pair of switches 523,524. Moreover, through appropriate selection of the inductances and capacitances of the various components, zero-voltage switching may be achieved. Additionally, parasitic inductances and capacitances are absorbed and do not therefore limit or impact the performance of the inverter 500.

The AC-to-DC inverter 500 has a differential or symmetric topology. Moreover, the inductances of the first and second inductors 521,522, the capacitances of the first and second capacitors 525,526, the capacitances of the third and fourth capacitors 531,533, the inductances of the fourth and fifth inductors 535,536, and the capacitances and inductances of the components of the first and second sub-networks 541,543 are the same. Additionally, as already noted, the controller 550 switches the switches 523,524 at a duty cycle of 0.5. As a result, the electrical power drawn by the electrodes is balanced over both sides (i.e. top and bottom of FIG. 1) of the AC-to-DC inverter 500. Additionally, the shape of the output voltage is symmetrical over each half-cycle.

A relatively well-balanced system may nevertheless be achieved with a degree of tolerance in the capacitances and inductances of the aforementioned components, as well as in the duty cycle of the switches. In particular, the controller 550 may switch the switches 523,524 at duty cycles of 0.5±5%. Furthermore, the ratio of the capacitances of the first and second capacitors 525,526, the capacitances of the third and fourth capacitors 531,533, the capacitances and/or the inductances of the sub-networks 541,543 may be 1.0±5%. Balanced power transfer is less sensitive to differences in the inductances of the fourth and fifth inductors 535,536, and least sensitive to differences in the inductances of the first and second inductors 521,522. Accordingly, the ratio of the inductances of the first and second inductors 521,522 may be 1.0±50%, the ratio of the inductances of the fourth and fifth inductors may be 1.0±20%.

With the particular topology illustrated in FIG. 15, zero or near-zero voltage switching may be achieved by employing components having capacitances and inductances defined by the following equations.

The first network 530 has a resonant frequency of $\omega_1$ defined by the equation:

$$\omega_1 = \frac{1}{2\pi\sqrt{L3\cdot\left(\frac{C3\cdot C4}{C3+C4}\right)}}$$

where C3 and C4 are the capacitances of the third and fourth capacitors 531,533, and L3 is the inductance of the third inductor 532. The controller 550 switches the switches 523,524 at a switching frequency of $\omega_s$. The ratio of $\omega_1/\omega_s$ is then defined as:

$$\frac{\omega_1}{\omega_S} = 0.64$$

The first capacitor 525 has a capacitance C1, the second capacitor 526 has a capacitance C2, the third capacitor 531 has a capacitance C3, the fourth capacitor has 533 a capacitance C4. The ratios C3/C1 and C4/C2 are then defined as:

$$\frac{C3}{C1} = \frac{C4}{C2} = 1.395$$

The fourth inductor 535 has an inductance L4, the fifth inductor 536 has an inductance L5, the inductor 544 of the first sub-network 541 has an inductance L6, and the inductor 547 of the second sub-network 543 has an inductance L7. L6 and L7 are then defined as:

$$L6 = L4 - 0.145\cdot L3$$

$$L7 = L5 - 0.145\cdot L3$$

The fifth capacitor 537 has a capacitance C5 defined as:

$$C5 = \frac{2}{\omega_S^2 L6} = \frac{2}{\omega_S^2 L7}$$

where L6 and L7 are the inductances of the inductors 544,547 of the sub-networks 541,543 and $\omega_s$ is the switching frequency of the switches 523,524.

The capacitors 545,548 of the sub-networks 541,543 are DC blocking capacitors and therefore have a relatively high capacitance, such as 0.1 μF.

The output capacitor 542 has a capacitance C8 defined as:

$$C8 = \frac{1}{\omega_S^2(L8+L9)}$$

where L8 and L9 are the inductances of the further inductors 546,549 of the sub-networks 541,543 and $\omega_s$ is the switching frequency of the switches 523,524.

The equations are normalised to the switching frequency and also to the DC input voltage. That is to say that the equations hold for different switching frequencies and/or different input voltages. Consequently, zero or near-zero voltage switching may be achieved at different switching frequencies and/or different input voltages.

Relatively low switching losses may still be achieved with a degree of tolerance or detuning in one or more of the above equations. In particular, relatively low switching losses may be achieved with a tolerance of ±20% in one or more of the above equations. So, for example, $\omega_1/\omega_s$ may be equal to 0.64±20%, C3/C1 and C4/C2 may each be equal to 1.395±20%, L6 may be equal to L4–0.145*L3±20%, L7 may similarly equal L5–0.145*L3±20%, each of L6 and L7 may be equal to $2/(\omega_s^2\cdot C5)\pm 20\%$, and C8 may be equal to $1/(\omega_s^2(L8+L9))\pm 20\%$.

The appliances 100,200 of FIGS. 6 and 8 comprise electrodes 40,41 having a variable spacing. The capacitance and thus the reactance of the electrodes 40,41 depends on the spacing of the electrodes 40,41. Consequently, as the spacing of the electrodes 40,41 varies, the DC-to-AC inverter 500 may become detuned slightly and thus the efficiency of the inverter 500 may decrease. In order to compensate for this, the DC-to-AC inverter 500 may comprise inductors that are mutually coupled and have a coupling coefficient that varies in response to changes in the electrode spacing. As a result, changes in the capacitance of the electrodes 40,41 may be offset by changes in the mutual inductance such that the net change in reactance is reduced.

Figure 16:
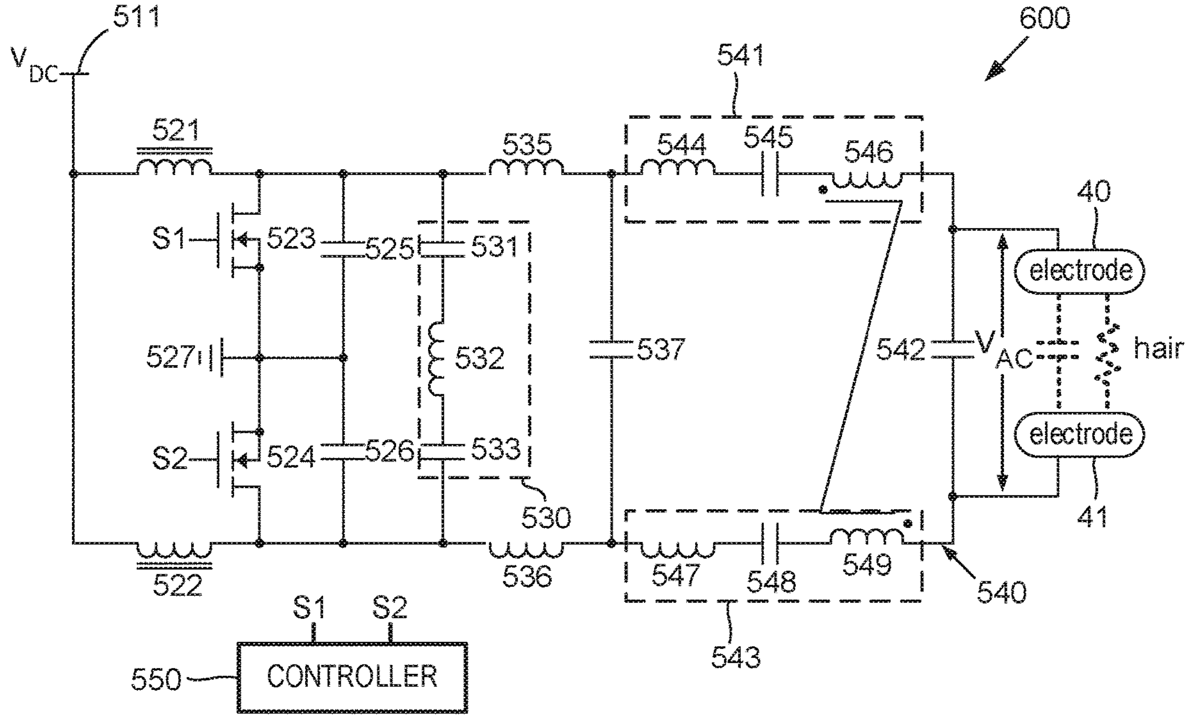
FIG. 16 is a circuit diagram of an alternative AC-to-DC inverter connected to electrodes.

FIG. 16 illustrates an alternative DC-to-AC inverter 600 connected to electrodes 40,41. The DC-to-AC inverter 600 is identical to that of FIG. 15 with the exception that the further inductors 546,549 of the sub-networks 541,543 are mutually coupled. The coupling coefficient of the further inductors 546,549 varies in response to changes in the spacing of the electrodes 40,41. More particularly, the coupling coefficient decreases in response to an increase in the spacing. As the spacing of the electrodes 40,41 increases, the capacitance decreases and thus the reactance increases. By decreasing the coupling coefficient in response to an increase in the spacing, the mutual inductance and thus the reactance decreases. As a result, the net change in reactance is reduced.

The further inductors 546,549 (i.e. those inductors which are mutually coupled) may be moveable relative to one another in order to vary the coupling coefficient. For example, each of the further inductors 546,549 may be housed within a respective arm of the appliance. Consequently, as the spacing of the electrodes 40,41 increases, so too does the separation of the further inductors 546,549. Since the coupling coefficient is inversely proportional to the separation of the further inductors 546,549, the coupling coefficient decreases as the spacing of the electrodes 40,41 increases, and vice versa. This then provides a convenient means for varying the coupling coefficient in response to changes in the spacing of the electrodes 40,41.

If the coupling coefficient is excessively high, it is possible that issues may arise with the stability of the inverter 600 during significant power transience, e.g. during power on and off. Accordingly, it may therefore be beneficial to have a coupling coefficient that is no greater than 0.5.

Where the inverter 600 comprises mutually-coupled inductors, the capacitance C8 of the output capacitor 542 is defined as:

$$C8 = \frac{1}{\omega_S^2\left(L8 + L9 + 2k\sqrt{L8 \cdot L9}\right)} \pm 20\%$$

where k is the maximum coupling coefficient of the further inductors 546,549 (i.e. the value of the coupling coefficient when the electrodes 40,41 are at a minimum spacing), L8 and L9 are the inductances of the further inductors 546,549, and $\omega_s$ is the switching frequency of the switches 523,524.

As will now be described with reference to FIGS. 17 and 18, the drive unit of the appliance may comprise more than one AC-to-DC inverter, and the appliance may comprise more than one pair of electrodes. Moreover, the inverters and the electrodes may be arranged such that a higher output power is transferred to the hair.

Figure 17:
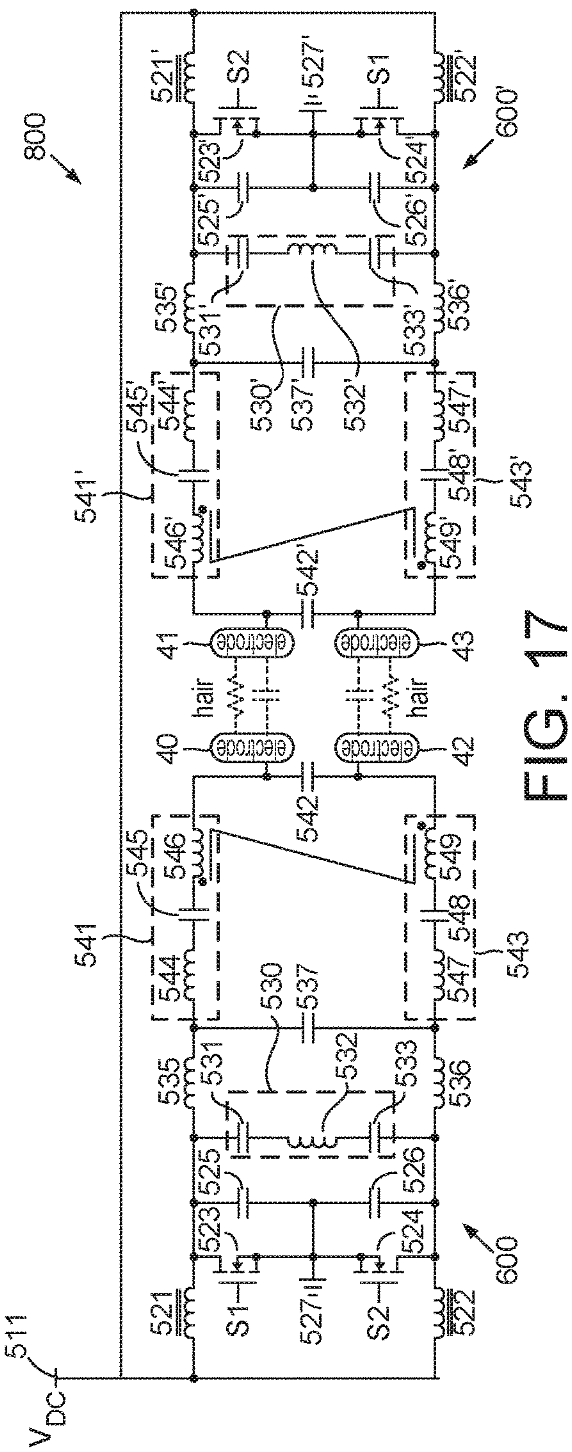
FIG. 17 is a circuit diagram of an AC-to-DC inverter system connected to electrodes.

FIG. 17 illustrates an AC-to-DC inverter system 800 comprising a first inverter 600 and a second inverter 600'. Each of the inverters 600,600' is identical to that shown in FIG. 16. The inverters 600,600' have a common controller (not shown) for controlling the switches 523,524,523'524'. The first inverter 600 outputs a first alternating voltage, and the second power inverter 600' outputs a second alternating voltage. The second alternating voltage has the same frequency as the first alternating voltage, but has a phase angle of 180 degrees relative to the first alternating voltage. This may be achieved by means of the switching signals S1, S2 generated by the controller. For example, the first switching signal S1 may be used to control the first switch 523 of the first inverter 600 and the second switch 524' of the second inverter 600', and the second switching signal S2 may be used to control the second switch 524 of the first power inverter 600 and the first switch 523' of the second power inverter 600'.

The first inverter 600 is connected to a pair of first electrodes 40,42, and the second power inverter 600' is connected to a pair of second electrodes 41,43. Each of the first electrodes 40,42 opposes and is parallel to one of the second electrodes 41,43. The appliance therefore comprises two pairs of parallel electrodes, each pair of electrodes comprising a first electrode 40,42 connected to the first inverter 600, and a second electrode 41,43 connected to the second inverter 600'.

For a given input voltage, the AC-to-DC inverter system 800 of FIG. 17 is capable of generating a higher voltage across each pair of electrodes 40,41; 42,43 in comparison to the single AC-to-DC inverter 600 of FIG. 16. As a consequence of the higher voltage, the electric field generated between the electrodes 40,41; 42,43 has a higher field strength. The AC-to-DC inverter system 800 is therefore capable of transferring a higher output power to the hair, resulting in improved heating and styling of the hair. The same output power could be achieved with the single AC-to-DC inverter 600 of FIG. 16 by employing a higher input voltage. However, the single inverter 600 would then suffer from higher power losses. With the AC-to-DC system 800 of FIG. 17, a given output power can be achieved more efficiently, albeit at the expense of a higher number of components.

Each of the inverters 600,600' comprises mutually-coupled inductors. As noted above, the mutual inductance may improve the efficiency of the system 800 in the event that the spacing of the electrodes 40,41; 42,43 changes. In the particular example shown in FIG. 17, the further inductor 546,546' of the first sub-network 541,541' of each inverter 600,600' is mutually coupled to the further inductor 549,549' of the second sub-network 543,543'. FIG. 18 shows an alternative AC-to-DC inverter system 900 in which the further inductors 546,546' of the first sub-networks 541,541' of the two inverters 700,700' are mutually coupled, and the further inductors 549,549' of the second sub-networks 543, 543' of the two inverters are mutually coupled. With the exception of the choice of inductors that are mutually coupled, the inverters 700,700' of FIG. 18 are unchanged from those of FIG. 17. The topologies of the power systems 800,900 of FIGS. 17 and 18 are electrically equivalent. However, depending on the particular appliance, one of the two systems 800,900 may be easier to package within the appliance.

Figure 18:
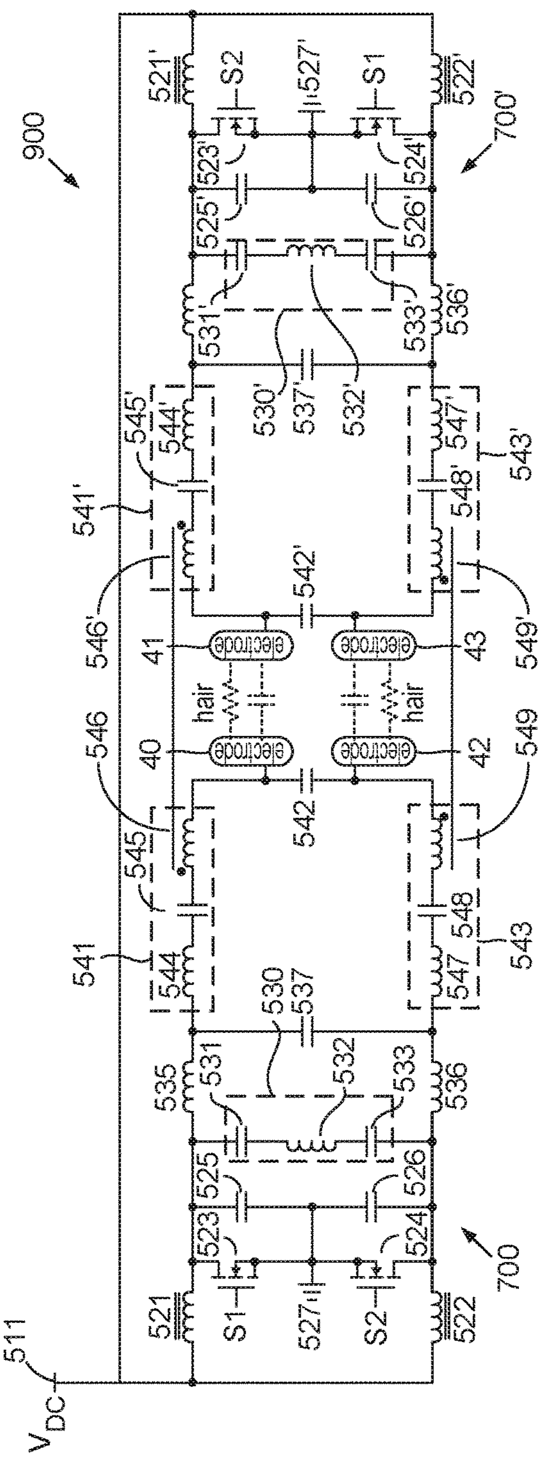
FIG. 18 is a circuit diagram of an alternative AC-to-DC inverter system connected to electrodes.

Although the AC-to-DC inverter systems 800,900 illustrated in FIGS. 17 and 18 have mutually-coupled inductors, the systems 800,900 may equally be used to power electrodes without mutual coupling; this is particularly true where the electrodes have a fixed spacing.

Whilst particular examples and embodiments have been described, it should be understood that various modifications may be made without departing from the scope of the invention as defined by the claims.

The invention claimed is:

1. A hair styling appliance comprising:

a pair of arms having an open position and a closed position, the arms gripping the hair when in the closed position;

a pair of electrodes;

a chamber located between the electrodes for receiving a section of hair; and a drive unit for applying an alternating voltage to the electrodes to heat dielectrically hair within the chamber, wherein the electrodes having a fixed spacing and wherein at least one of the arms is moveable to vary a spacing between the arms without varying the spacing between the electrodes.

2. The hair styling appliance as claimed in claim 1, wherein the spacing is no greater than 10 mm.

3. The hair styling appliance as claimed in claim 1, wherein the spacing is no less than 1 mm.

4. The hair styling appliance as claimed in claim 1, wherein the height of the chamber is between 1 mm and 10 mm.

5. The hair styling appliance as claimed in claim 1, wherein the electrodes are coated with or housed within a thermally insulating material.

6. The hair styling appliance as claimed in claim 1, wherein the appliance comprises a body having a pair of prongs, and each of the electrodes is attached to or housed within a respective prong.

7. The hair styling appliance as claimed in claim 6, wherein an end of each of the prongs is chamfered.

8. The hair styling appliance as claimed in claim 1, wherein the electrodes are attached to or housed within a body, the arms are attached to the body, and at least one of the arms is moveable relative to the body.

9. The hair styling appliance as claimed in claim 8, wherein the at least one of the arms is pivotally attached to the body.

10. The hair styling appliance as claimed in claim 8, wherein the appliance comprises a flexible membrane that extends between the body and the at least one of the arms.

11. The hair styling appliance as claimed in claim 1, wherein at least one of the arms comprises a gripping portion for gripping the hair, the gripping portion being formed of a resiliently deformable material.

* * * * *